(12) United States Patent
Li

(10) Patent No.: US 11,475,894 B2
(45) Date of Patent: Oct. 18, 2022

(54) METHOD AND APPARATUS FOR PROVIDING FEEDBACK INFORMATION BASED ON AUDIO INPUT

(71) Applicant: TENCENT TECHNOLOGY (SHENZHEN) COMPANY LIMITED, Shenzhen (CN)

(72) Inventor: Longbin Li, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 202 days.

(21) Appl. No.: 16/906,525

(22) Filed: Jun. 19, 2020

(65) Prior Publication Data
US 2020/0320135 A1    Oct. 8, 2020

Related U.S. Application Data

(63) Continuation of application No. PCT/CN2019/072957, filed on Jan. 24, 2019.

(30) Foreign Application Priority Data

Feb. 1, 2018    (CN) .......................... 201810103534.5

(51) Int. Cl.
    *G10L 15/26*      (2006.01)
    *G06F 16/9032*      (2019.01)
    *G06F 16/908*      (2019.01)

(52) U.S. Cl.
    CPC ............ *G10L 15/26* (2013.01); *G06F 16/908* (2019.01); *G06F 16/90332* (2019.01)

(58) Field of Classification Search
    CPC ....................................................... G10L 15/26
    See application file for complete search history.

(56) References Cited

U.S. PATENT DOCUMENTS 5,995,928 A * 11/1999 Nguyen .................. G10L 15/18
                                                               704/251
7,904,298 B2 * 3/2011 Rao ......................... G10L 15/22
                                                                704/243

(Continued)

FOREIGN PATENT DOCUMENTS

CN      104361507 A      2/2015
CN      105578277 A      5/2016

(Continued)

OTHER PUBLICATIONS

Notice of Reasons for Refusal issued on Japanese Application 2020-541391 dated Sep. 22, 2021, 6 pages.

(Continued)

*Primary Examiner* — Shaun Roberts
(74) *Attorney, Agent, or Firm* — Crowell & Moring, L.L.P.

(57) ABSTRACT

This application discloses a method and apparatus for processing audio information, a storage medium, and an electronic apparatus. The method includes: detecting that a segment of audio information is being received on a client, a first portion of audio information in the segment of audio information having been currently received on the client; obtaining first information, second information, and third information based on the first portion of audio information that has been currently received, the first information including text information corresponding to the first portion of audio information, the second information including information that meets a target condition and that corresponds to the first information, and the third information including information to be pushed to the client, which is obtained based on a keyword in the first information; and displaying the first information, the second information, and the third information on the client. A technical problem of relatively (Continued)

low processing efficiency of processing audio information in the related art is resolved according to this application.

13 Claims, 12 Drawing Sheets

(56) References Cited

U.S. PATENT DOCUMENTS

| | | | |
|---|---|---|---|
| 8,224,654 B1* | 7/2012 | LeBeau | G10L 15/26 |
| | | | 704/235 |
| 8,515,750 B1* | 8/2013 | Lei | G10L 15/26 |
| | | | 704/235 |
| 9,318,102 B2* | 4/2016 | Lee | G10L 15/01 |
| 10,102,851 B1* | 10/2018 | Kiss | G10L 15/05 |
| 10,242,670 B2* | 3/2019 | Pereg | G10L 15/197 |
| 2006/0161434 A1* | 7/2006 | Faisman | G10L 15/22 |
| | | | 704/E15.04 |
| 2011/0112837 A1* | 5/2011 | Kurki-Suonio | G10L 15/22 |
| | | | 704/235 |
| 2012/0232904 A1* | 9/2012 | Zhu | G10L 15/22 |
| | | | 704/E15.005 |
| 2012/0297958 A1 | 11/2012 | Rassool et al. | |
| 2013/0103849 A1 | 4/2013 | Mao et al. | |
| 2014/0156268 A1* | 6/2014 | Arizmendi | G10L 15/1822 |
| | | | 704/231 |
| 2015/0100316 A1* | 4/2015 | Williams | G10L 15/04 |
| | | | 704/240 |
| 2015/0269949 A1* | 9/2015 | Chang | G10L 19/005 |
| | | | 704/201 |
| 2016/0210115 A1* | 7/2016 | Lee | G06F 3/167 |
| 2016/0351196 A1* | 12/2016 | Fanty | G10L 17/00 |
| 2017/0124045 A1* | 5/2017 | Canton | G06F 3/04842 |
| 2017/0221486 A1* | 8/2017 | Kurata | G10L 13/00 |
| 2018/0330730 A1* | 11/2018 | Garg | G10L 15/1815 |

FOREIGN PATENT DOCUMENTS

| | | |
|---|---|---|
| CN | 105681318 A | 6/2016 |
| CN | 105959806 A | 9/2016 |
| CN | 105979376 A | 9/2016 |
| JP | 2004-264464 A | 9/2004 |
| JP | 2006-209022 A | 8/2006 |
| JP | 2008-097082 A | 4/2008 |
| JP | 2010-282639 A | 12/2010 |
| JP | 2012-226068 A | 11/2012 |

OTHER PUBLICATIONS

Office Action of Indian Application No. 202037034524 dated Jun. 21, 2021, 6 pages.
International Search Report issued in PCT/CN2019/072957 dated Apr. 29, 2019, with English translation.

* cited by examiner

METHOD AND APPARATUS FOR PROVIDING FEEDBACK INFORMATION BASED ON AUDIO INPUT

RELATED APPLICATION

This application is a continuation application of PCT Patent Application No. PCT/CN2019/072957, filed on Jan. 24, 2019, which claims priority to Chinese Patent Application No. 2018101035345, entitled "METHOD AND APPARATUS FOR PROCESSING AUDIO INFORMATION, STORAGE MEDIUM, AND ELECTRONIC APPARATUS" and filed with the National Intellectual Property Administration, PRC on Feb. 1, 2018, which is incorporated by reference in its entirety.

FIELD OF THE TECHNOLOGY

This application relates to the computer field, and specifically, to a method and apparatus for processing audio information, a storage medium, and an electronic apparatus.

BACKGROUND OF THE DISCLOSURE

When a user interacts with an application program client, the user usually needs to input information into the client, for example, in an input manner such as typing or handwriting. To enable human-machine interaction to be more convenient, voice input may be further performed. The client recognizes audio information inputted by the user and performs feedback for an indication of the user. However, content that is fed back is usually not what the user actually desires. Consequently, processing efficiency of processing the audio information is relatively low, and an actual requirement of the user cannot be met. As a result, user experience is relatively poor. For the foregoing problem, no effective solution has been proposed currently.

SUMMARY

Embodiments of this application provide a method and apparatus for processing audio information, a storage medium, and an electronic apparatus, to resolve at least a technical problem of relatively low processing efficiency of processing audio information in the related art.

According to one aspect of the embodiments of this application, a method for processing audio information is provided, including: detecting, by a client, that a segment of audio information is being received, a first portion of audio information in the segment of audio information having been currently received on the client; obtaining, by the client, first information, second information, and third information based on the first portion of audio information that has been currently received, the first information including text information corresponding to the first portion of audio information, the second information including information that meets a target condition and corresponds to the first information, and the third information including information to be pushed to the client, which is obtained based on a keyword in the first information; and displaying, by the client, the first information, the second information, and the third information.

According to another aspect of the embodiments of this application, a method for processing audio information is further provided, including: receiving, by a server, a first portion of audio information transmitted by a client, the client detecting that a segment of audio information is being received, and the first portion of audio information being a portion of audio information in the segment of audio information that has been currently received on the client; converting, by the server, the first portion of audio information into first information, and transmitting the first information to the client, the first information including text information corresponding to the first portion of audio information; editing the first information to obtain second information, and obtaining third information according to a keyword carried in the first information, the second information including information that meets a target condition and that corresponds to the first information, and the third information including information that is to be pushed to the client; and transmitting, by the server, the second information and the third information to the client.

According to another aspect of the embodiments of this application, a product is further provided, including machine-readable media other than a transitory signal and instructions stored on the machine-readable media. The instructions are configured to, when executed, cause a machine to: detect a segment of audio information being received, a first portion of audio information in the segment of audio information having been currently received on a client; obtain first information, second information, and third information based on the first portion of audio information that has been currently received, the first information including text information corresponding to the first portion of audio information, the second information including information that meets a target condition and corresponds to the first information, and the third information including information to be pushed to the client, which is obtained based on a keyword in the first information; and display the first information, the second information, and the third information.

According to another aspect of the embodiments of this application, a storage medium is further provided, the storage medium storing a computer program, the computer program being configured to perform the method in any one of the foregoing aspects when being run.

According to another aspect of the embodiments of this application, an electronic apparatus is further provided, the electronic apparatus including a memory and a processor, the memory storing a computer program, and the processor being configured to perform the method in any one of the foregoing aspects through the computer program.

In the embodiments of this application, a manner is used, including: detecting, by a client, that a segment of audio information is being received, a first portion of audio information in the segment of audio information having been currently received on the client; obtaining, by the client, first information, second information, and third information according to the first portion of audio information that has been currently received, the first information including text information corresponding to the first portion of audio information, the second information including information that meets a target condition and that corresponds to the first information, and the third information including information that is to be pushed to the client and that is obtained according to a keyword in the first information; and displaying, by the client, the first information, the second information, and the third information. When it is detected that a segment of audio information is being received on a client, according to a first portion of audio information in the segment of audio information that has been currently received on the client, text information corresponding to the first portion of audio information is obtained to be used as first information. Information that meets a target condition and that corresponds to the first information is obtained to be used as second information, and information that is to be pushed to the client and that is obtained according to a keyword in the first information is obtained to be used as third information. The first information, the second information, and the third information are simultaneously displayed on the client. More accurate and richer feedback information is provided for a user in real time when the user performs audio input, so that the user may perform different operations according to the obtained information during the audio input, thereby implementing a technical effect that processing efficiency of processing audio information is improved, and further resolving a technical problem of relatively low processing efficiency of processing audio information in the related art.

BRIEF DESCRIPTION OF THE DRAWINGS

The accompanying drawings described herein are used for providing further understanding for this application and constitute a part of this application. Exemplary embodiments of this application and descriptions thereof are used for explaining this application and do not constitute an improper limitation to this application. In the accompanying drawings.

DESCRIPTION OF EMBODIMENTS

To make a person skilled in the art better understand solutions of this application, the following clearly and completely describes the technical solutions in embodiments of this application with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

In the specification, claims, and accompanying drawings of this application, the terms "first", "second", and so on are intended to distinguish between similar objects rather than indicating a specific order. The data termed in such a way are interchangeable in proper circumstances, so that the embodiments of this application described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device.

Figure 1:
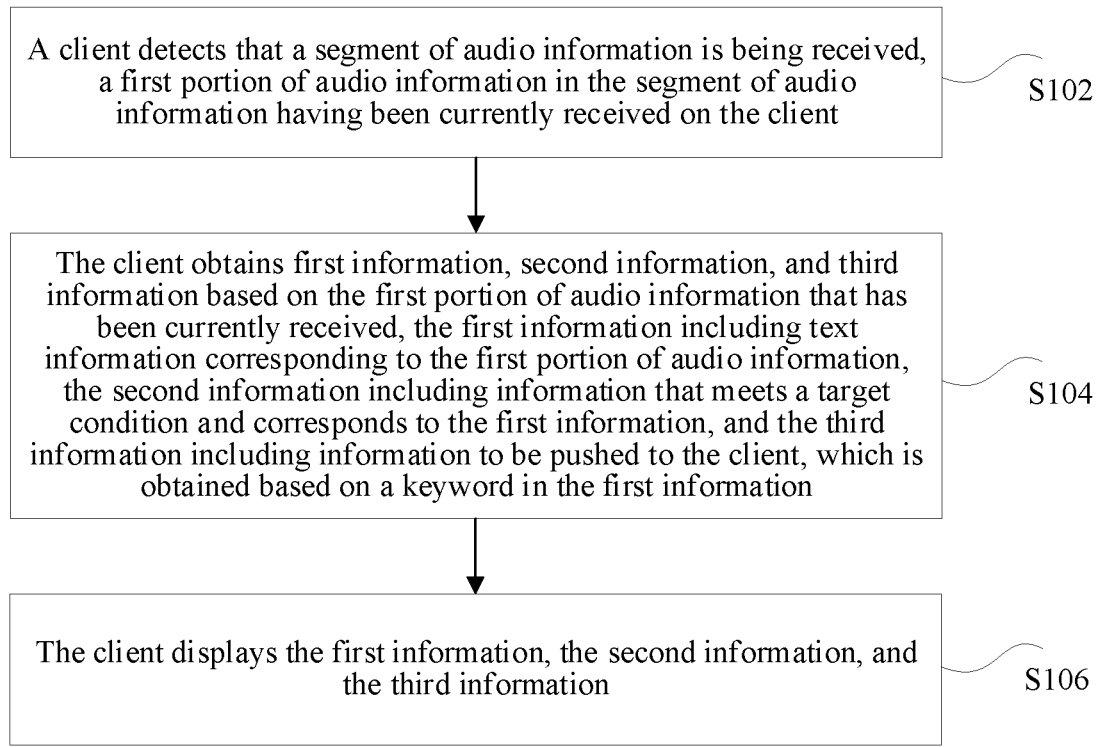
FIG. 1 is a schematic diagram of an optional method for processing audio information according to an embodiment of this application.

According to one aspect of the embodiments of this application, a method for processing audio information is provided. As shown in FIG. 1, the method includes:

S102. A client detects that a segment of audio information is being received, a first portion of audio information in the segment of audio information having been currently received on the client.

S104. The client obtains first information, second information, and third information based on the first portion of audio information that has been currently received, the first information including text information corresponding to the first portion of audio information, the second information including information that meets a target condition and that corresponds to the first information, and the third information including information that is to be pushed to the client and that is obtained based on a keyword in the first information.

S106. The client displays the first information, the second information, and the third information.

Figure 2:
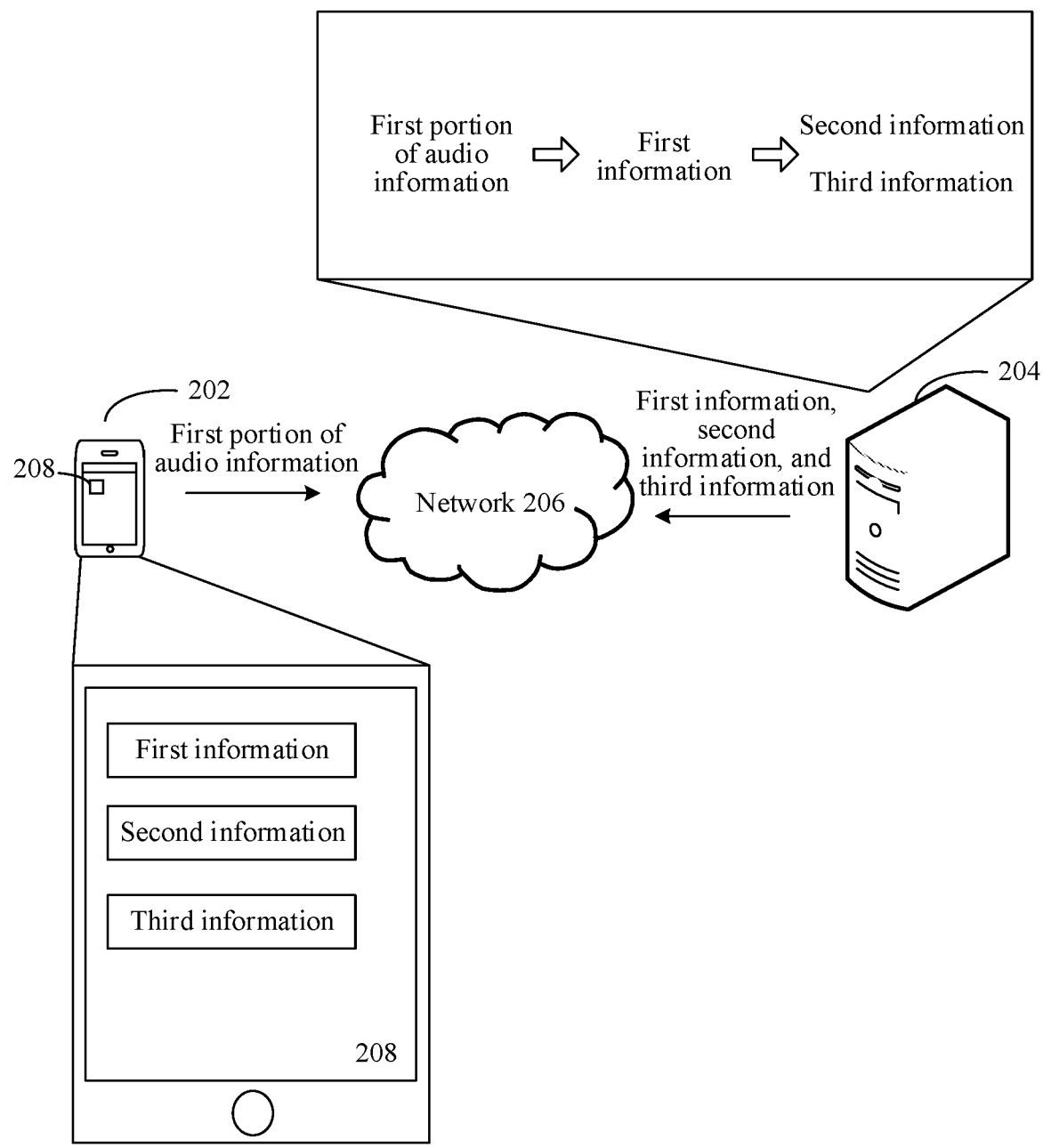
FIG. 2 is a schematic diagram of an application environment of an optional method for processing audio information according to an embodiment of this application.

Optionally, in this embodiment, the foregoing method for processing audio information may be applied to a hardware environment formed by a terminal 202, a server 204 and a network 206 shown in FIG. 2. As shown in FIG. 2, the terminal 202 is connected to the server 204 by using the network 206. A client 208 is installed on the terminal 202. The terminal 202 is configured to: detect that a segment of audio information is being received on the client 208, a first portion of audio information in the segment of audio information having been currently received on the client 208; obtain first information, second information, and third information based on the first portion of audio information that has been currently received, the first information including text information corresponding to the first portion of audio information, the second information including information that meets a target condition and that corresponds to the first information, and the third information including information that is to be pushed to the client 208 and that is obtained based on a keyword in the first information. When detecting that the segment of audio information is being received, the terminal 202 may transmit the first portion of audio information to the server 204. The server 204 receives the first portion of audio information transmitted by the client 208; converts the first portion of audio information into the first information, and transmits the first information to the client 208; obtains the second information by editing the first information, and obtains the third information based on the keyword carried in the first information; and transmits the second information and the third information to the client 208. The terminal 202 receives the first information, the second information, and the third information transmitted by the server 204, and displays the first information, the second information, and the third information on the client 208.

Figure 3:
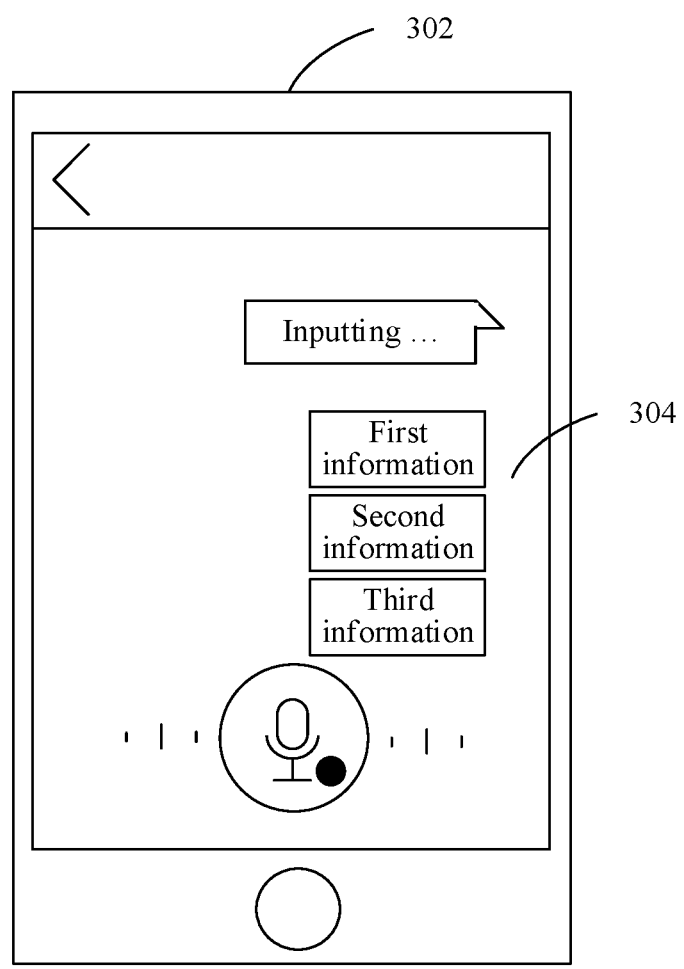
FIG. 3 is a schematic diagram of an application environment of an optional method for processing audio information according to an embodiment of this application.

Optionally, in this embodiment, the foregoing method for processing audio information may be further applied to a hardware environment formed by a terminal 302 shown in FIG. 3. As shown in FIG. 3, a client 304 configured to process audio information is installed on the terminal 302. The terminal 302 detects, on the client 304 by detecting a touch on a microphone icon on a display interface of the client 304 (a black dot on the microphone icon in FIG. 3 shows that a user touches the microphone icon), that a segment of audio information is being received on the client 304, and displays, in real time, first information, second information, and third information obtained based on a first portion of audio information in the received segment of audio information on the display interface of the client 304 with inputting of the segment of audio information. The first information is text information corresponding to the first portion of audio information, the second information is information that meets a target condition and that corresponds to the first information, and the third information is information that is to be pushed to the client and that is obtained based on a keyword in the first information. The first information, the second information, and the third information are updated in real time with updating of the first portion of audio information, that is, a portion of information that has been received is converted into text as the first information to be displayed on an interface of the client when the client 304 receives the segment of audio information. Simultaneously, the first information is converted into the second information, and the third information is obtained based on the keyword carried in the first information. The second information and the third information corresponding to the first information are displayed on the interface of the client 304 when the first information is displayed.

Optionally, in this embodiment, the method for processing audio information may be applied to, but is not limited to, a scenario in which information inputted by a user through voice is received on a client. The client may be, but is not limited to, various types of applications, for example, an online education application, an instant messaging application, a community space application, a game application, a shopping application, a browser application, a financial application, a multimedia application, and a live broadcast application. Optionally, the method may be applied to, but is not limited to, a scenario in which information inputted by a user through voice is received on the browser application, or may be applied to, but is not limited to, a scenario in which information inputted by a user through voice is received on the instant messaging application, to improve processing efficiency of processing audio information. The foregoing is merely an example, and no limitation is imposed in this embodiment.

Optionally, in this embodiment, the method for processing audio information may be applied to, but is not limited to, a terminal device side, for example, a mobile phone, a tablet computer, a PC computer, a smart wearable device, and a smart household device.

Optionally, in this embodiment, the audio information may be, but is not limited to, voice information, a song, audio information in a video, or the like.

Figure 4:
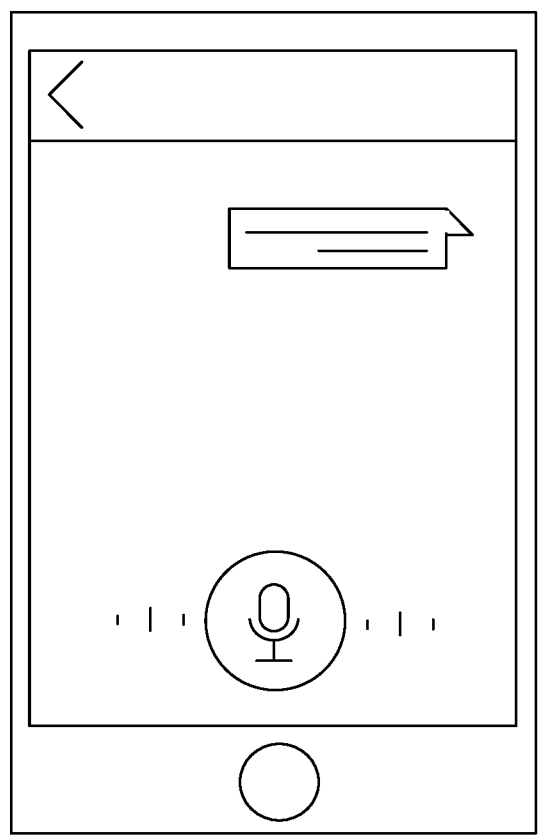
FIG. 4 is a schematic diagram of an optional method for processing audio information according to an optional implementation of this application.

Optionally, in this embodiment, a manner in which a client detects whether a segment of audio information is being received may be, but not limited to, detecting operation information received by an icon displayed on the client. For example, as shown in FIG. 4, a session interface is displayed on the client, and a "microphone" icon is displayed on the session interface, to instruct a user to input audio information by operating the icon. When inputting a segment of audio information, the user may continuously touch the icon. The client determines, by detecting the continuous touch operation, that the segment of audio information is being received. When it is detected that the touch operation is interrupted, it is determined that the user has ended current inputting of the audio information. Alternatively, in another manner, a tap operation performed on the icon may be detected. When the first tap operation is detected, it is determined that a segment of audio information begins to be received. When the second tap operation is detected, it is determined that the receiving the segment of audio information ends.

Optionally, in this embodiment, the first portion of audio information is a portion that has been received in the segment of audio information that is being received and that is detected on the client. The segment of audio information that is being received and that is detected on the client may be a few words said by the user, several lines of lyrics in a song, several lines in a segment of video, and the like. Then, a process of receiving these pieces of audio information may last for a period of time, and text information obtained by converting the first portion of audio information that has been received is displayed on the client in real time within the period of time. Therefore, content of information that has been received can be presented to the user in real time. Information that meets a target condition and that corresponds to the text information is presented on the client in real time. If the information is information that the user desires to input, the user may directly use the information to perform a subsequent operation without the need of continuing inputting of audio information, thereby saving time. In addition, to-be-pushed information obtained based on a keyword in the text information is displayed on the client, so that content in which the user may be interested can be recommended to the user in real time, thereby improving user interaction experience.

Optionally, in this embodiment, the target condition may include, but is not limited to, a target syntax rule (the syntax rule may refer to a syntax rule that is specified in a language corresponding to the text information, and that may be obtained through a training process of deep learning, or may be a manually set rule), or a target semantic rule, for example, semantics completion (completion may refer to that a sentence does not lack any element, for example, the sentence has a subject, a predicate, an object, an attribute, an adverbial, and a complement, or may refer to that a sentence can express a complete meaning), or meeting both the target syntax rule and the target semantic rule.

Figure 5:
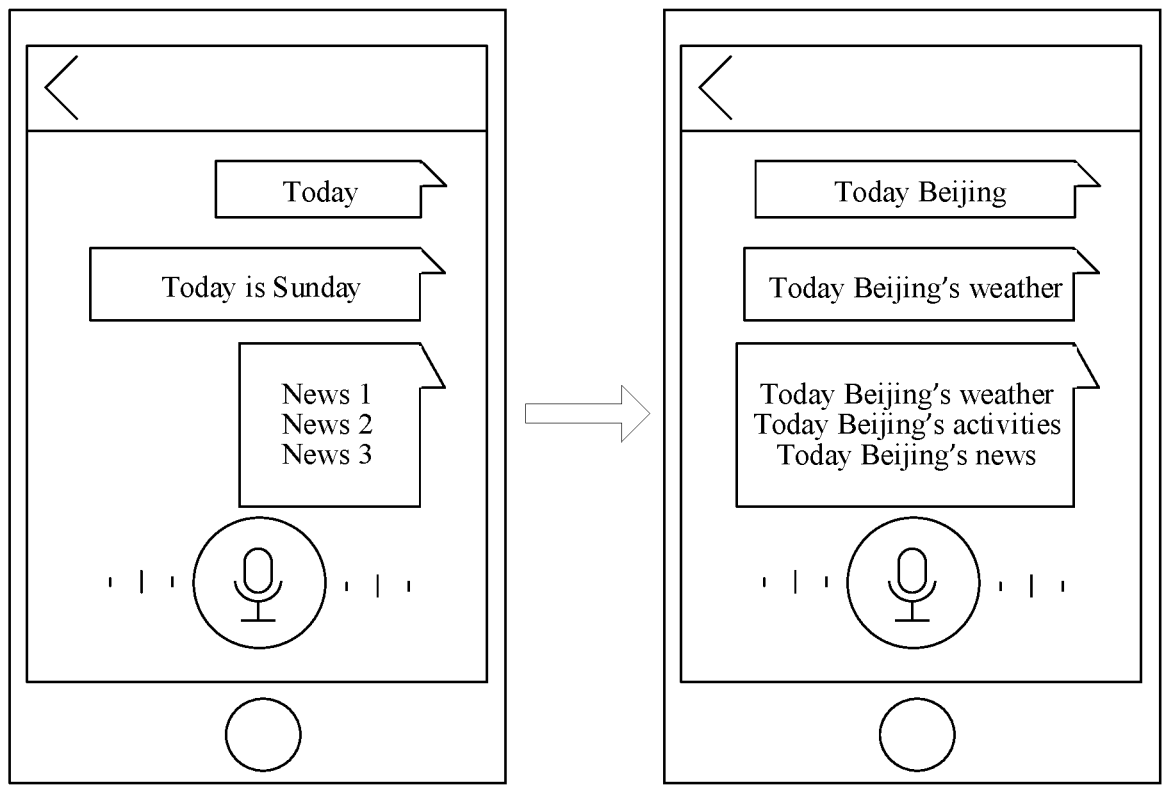
FIG. 5 is a schematic diagram of an optional method for processing audio information according to an optional implementation of this application.

In an optional implementation, as shown in FIG. 5, a session interface into which audio information is inputted is displayed on a client, a user inputs, by tapping a "microphone" icon, and voice information as the foregoing segment of audio information. Voice that the user originally desires to input is "today Beijing's weather". When the user is speaking, it is detected that the segment of audio information is being received. In this case, the user speaks "today" into a microphone, so that the client uses "today" as a first portion of audio information. First information that is obtained based on the first portion of audio information is "today", and second information that meets a target condition and that corresponds to the first information is "today is Sunday". Third information that is to be pushed to the client and that is obtained based on a keyword in the first information is three pieces of news of today: news 1, news 2, and news 3. "today", "today is Sunday", and "news 1, news 2, and news 3" are displayed on the client. Then, the user continues to speak "Beijing". In this case, the client uses "today Beijing" as a first portion of audio information. First information is obtained as "today Beijing", and second information that meets a target condition and that corresponds to the first information is "today Beijing's weather". Third information that is to be pushed to the client and that is obtained based on a keyword in the first information is "today Beijing's weather, today Beijing's activities, and today Beijing's news". "today Beijing", "today Beijing's weather", and "today Beijing's weather, today Beijing's activities, and today Beijing's news" are displayed on the client. After seeing content displayed on the client at this time, the user finds that "today Beijing's weather" is content that the user desires to obtain. The user may tap the second information displayed on the client as complete input information, or tap "today Beijing's weather" in the third information displayed on the client to view weather information.

Optionally, in this embodiment, after the first information, the second information, and the third information are displayed on the client, information about operations performed on these pieces of information may be detected. The user may directly perform operations on these pieces of information, and the client provides different feedback for the user based on different operations.

For example, the user may edit the first information by tapping the first information. Response information corresponding to the second information may be obtained by tapping the second information. A page corresponding to the third information may be viewed by tapping the third information.

Optionally, in this embodiment, the user may perform an editing operation on the first information. The editing operation performed on the first information may be received in a case in which a third operation performed on the first information is detected, and an editing result obtained after performing the editing operation is displayed on the client.

Optionally, in this embodiment, after a tap operation that is performed by the user on the first information is detected, one text input box carrying the first information may be displayed on the client, and an editing operation that is performed by the user on the first information is detected in the text input box. After the editing ends, an editing result in the text input box is used as fourth information and displayed on the client. For example, a text input box carrying the first information is displayed on the client, an editing operation performed on the first information in the text input box is detected, and an editing result is displayed in the text input box in response to the editing operation. In a case in which an editing completion instruction is detected, fourth information corresponding to a target editing result is displayed on a session interface corresponding to the segment of audio information. The target editing result is an editing result displayed in the text input box after editing completion information is detected, and the editing completion instruction is used for indicating that the editing operation has ended.

Optionally, in this embodiment, the client may obtain feedback information corresponding to the fourth information based on the displayed fourth information, and display the feedback information on the client. For example, feedback information corresponding to the fourth information is obtained, and the feedback information is displayed on the session interface.

It can be seen that, through the foregoing steps, when it is detected that a segment of audio information is being received on a client, based on a first portion of audio information in the segment of audio information that has been currently received on the client, text information corresponding to the first portion of audio information is obtained to be used as first information. Information that meets a target condition and that corresponds to the first information is obtained to be used as second information, and information that is to be pushed to the client and that is obtained based on a keyword in the first information is obtained to be used as third information. The first information, the second information, and the third information are simultaneously displayed on the client. More accurate and richer feedback information is provided for a user in real time when the user performs audio input, so that the user may perform different operations based on the obtained information during the audio input, thereby implementing a technical effect that processing efficiency of processing audio information is improved, and further resolving a technical problem of relatively low processing efficiency of processing audio information in the related art.

In an optional solution, after the client displays the first information, the second information, and the third information, the method further include:

S1. The client obtains response information corresponding to the second information in a case that a first operation performed on the second information is detected.

S2. The client displays the response information.

Meeting the target condition includes at least one of the following: meeting a target syntax rule, and meeting a target semantic rule.

Figure 6:
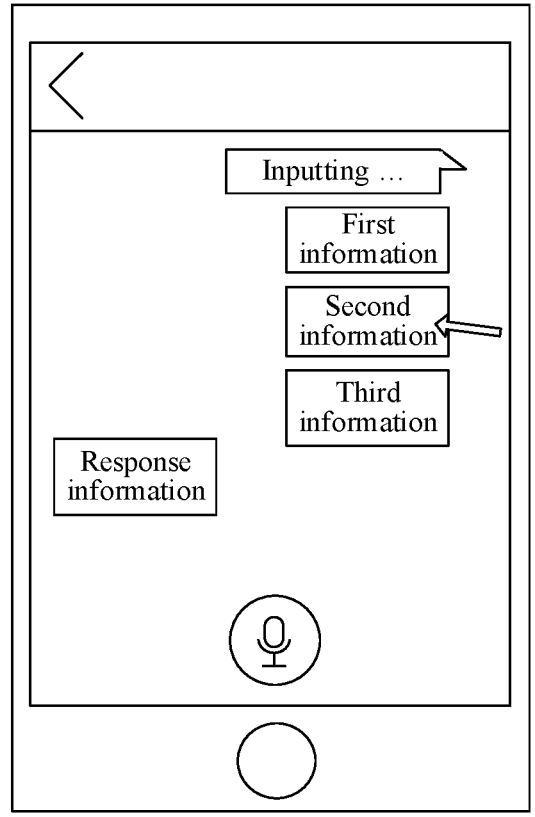
FIG. 6 is a schematic diagram of an optional method for processing audio information according to an optional implementation of this application.

Optionally, in this embodiment, the first operation may be, but is not limited to, a tap operation. For example, as shown in FIG. 6, first information, second information, and third information are displayed on a client. Response information corresponding to the second information is obtained in a case that a tap operation performed on the second information is detected, and the response information is displayed on the client.

Optionally, in this embodiment, a syntax error of the first information is corrected by setting a target syntax rule. By setting a target semantic rule, the first information or rewrite information whose syntax error is corrected is semantically supplemented, to obtain second information with correct syntax and complete semantics.

Optionally, in this embodiment, the information that meets the target condition and that corresponds to the first information may be information obtained in a manner of performing error correction on the syntax of the first information based on a target syntax rule, rewriting the first information based on an error correction result to obtain rewrite information, and then supplementing the rewrite information based on a target semantic rule.

In an optional solution, after the client displays the first information, the second information, and the third information, the method further include:

S1. The client requests a page corresponding to the third information from a first server corresponding to the third information in a case that a second operation performed on the third information is detected.

S2. The client receives the page returned by the first server.

S3. The client displays the page.

Figure 7:
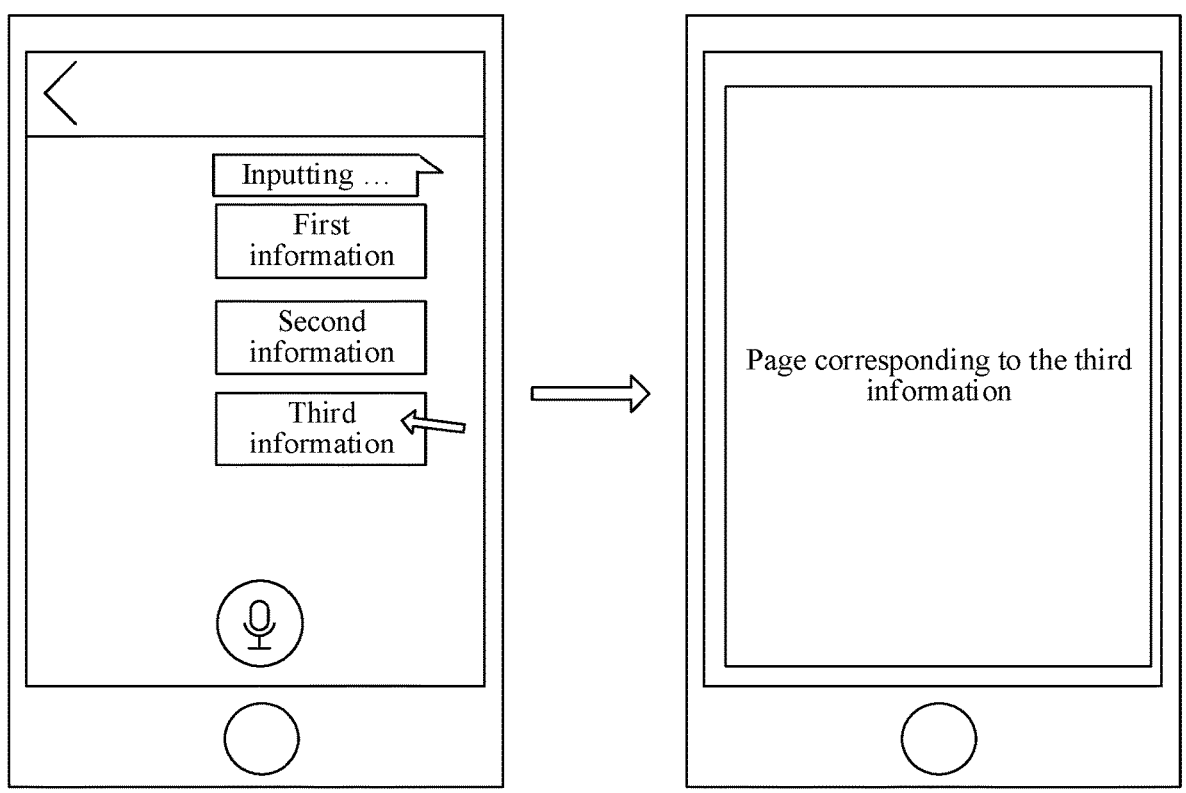
FIG. 7 is a schematic diagram of an optional method for processing audio information according to an optional implementation of this application.

Optionally, in this embodiment, the second operation may be, but is not limited to, a tap operation. For example, as shown in FIG. 7, first information, second information, and third information are displayed on a client. A page corresponding to the third information is requested from a first server corresponding to the third information in a case that a tap operation performed on the third information is detected, the page returned by the first server is received, and the received page is displayed on the client.

Optionally, in this embodiment, the third information may include, but is not limited to, content information and one or more pieces of prompt information. The content information is used for indicating content of information that is to be pushed to the client. The detected second operation performed on the third information may include, but is not limited to, a first sub-operation performed on the content information, and a second sub-operation performed on target prompt information in the one or more pieces of prompt information. The requesting a page corresponding to the third information from a first server corresponding to the third information may include, but is not limited to, requesting pages corresponding to any one or more types of information in the foregoing two types of third information. For example, a first page corresponding to the content information is requested from the first server in a case that a first sub-operation performed on the content information is detected, where the second operation includes the first sub-operation. In a case that a second sub-operation performed on target prompt information in the one or more pieces of prompt information is detected, a second page corresponding to the target prompt information is requested from the first server, where the second page and the first page are different pages belonging to the same field, or fields to which the second page and the first page belong are different, and the second operation includes the second sub-operation.

Figure 8:
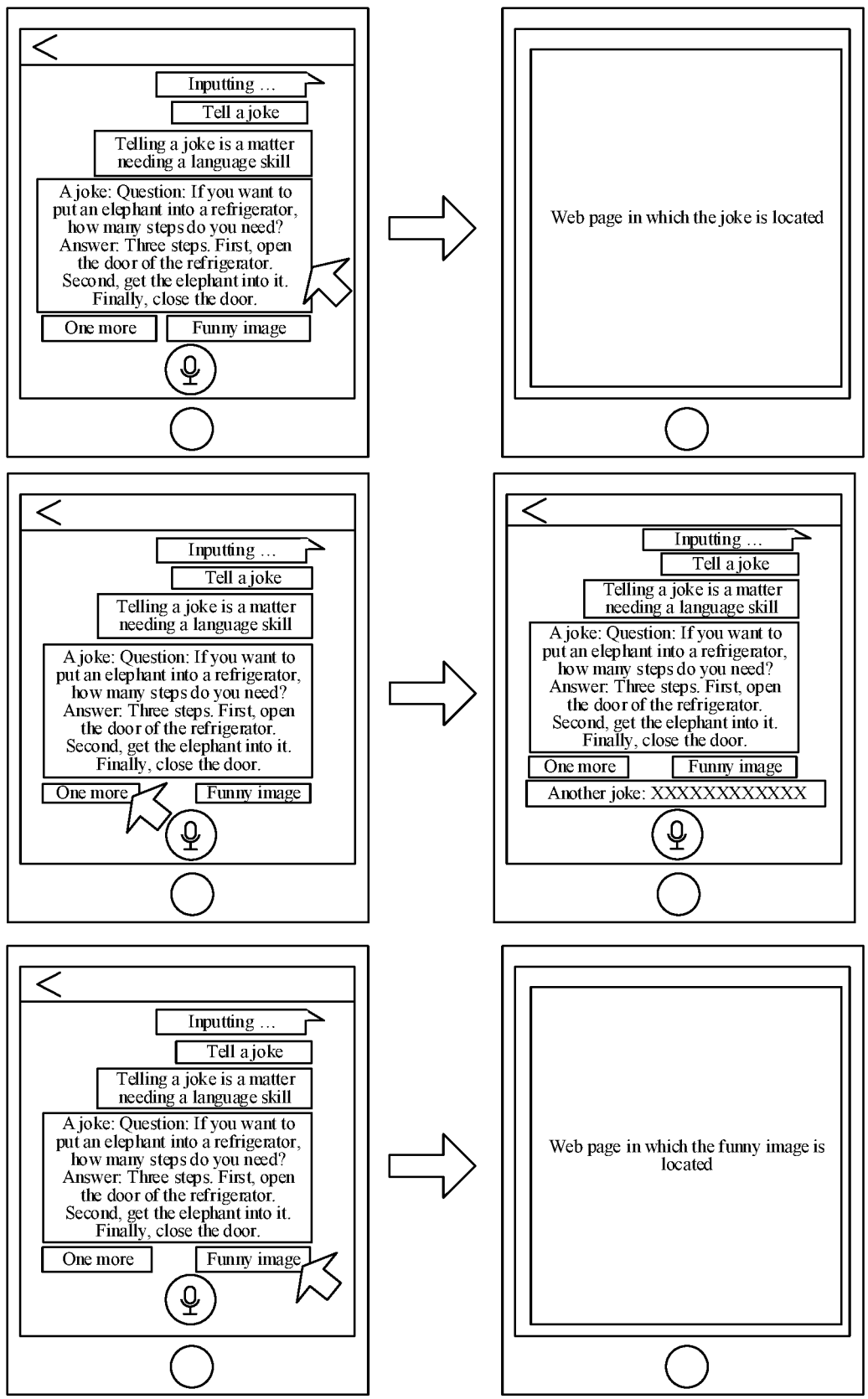
FIG. 8 is a schematic diagram of an optional method for processing audio information according to an optional implementation of this application.

In an optional implementation, as shown in FIG. 8, first information, second information, content information, first prompt information, and second prompt information are displayed on a client. The first information is text information corresponding to the first portion of audio information, that is, "Tell a joke", the second information is information that meets a target condition and that corresponds to the first information, that is, "Telling a joke is a matter needing a language skill". The content information is information that is pushed to the client and that is obtained based on a keyword, "joke", in the first information, that is, "A joke: Question: If you want to put an elephant into a refrigerator, how many steps do you need? Answer: Three steps. First, open the door of the refrigerator. Second, get the elephant into it. Finally, close the door." The first prompt information is an icon of "One more", and the second prompt information is an icon of "Funny image". The user may tap information that the user desires to obtain based on a requirement. For example, the client may detect a tap operation performed on the content information, and if the tap operation is detected, an interface of the client jumps to a web page in which the joke is located. The client may detect a tap operation performed on the first prompt information, and if the tap operation is detected, the client obtains another joke and displays the joke on the current interface. The client may further detect a tap operation performed on the second prompt information, and if the tap operation is detected, the client may obtain a funny image and display the funny image on the current interface (not shown in FIG. 8), or the interface may jump to a web page with funny images.

In an optional solution, the obtaining, by the client, first information, second information, and third information based on the first portion of audio information that has been currently received includes:

S1. The client transmits an information request corresponding to a current time interval every target time interval from the beginning of receiving the segment of audio information, where the information request carries a second portion of audio information, the information request is used for requesting the first information, the second information, and the third information that correspond to the second portion of audio information, and the second portion of audio information is audio information received within the current time interval.

S2. The client receives the first information, the second information, and the third information that correspond to the second portion of audio information, where the first information, the second information, and the third information are information obtained based on the first portion of audio information that has been currently received, the first portion of audio information is information obtained by splicing the second portion of audio information and a third portion of audio information in chronological order, and the third portion of audio information is audio information, in the segment of audio information, received within a time before the current time interval.

Optionally, in this embodiment, the client may interact with a second server, thereby obtaining the first information, the second information, and the third information of a current time interval every target time interval. A conversion process of the foregoing first information, second information, and third information may be alternatively performed by the client.

Optionally, in this embodiment, a frequency of displaying the first information, the second information, and the third information on the client may be set by setting a target time interval. For example, the target time interval may be set to 200 ms. When receiving a segment of audio information, the client transmits the second portion of audio information once to the second server every 200 ms, thereby obtaining the first information, the second information, and the third information returned by the second server, and displaying the first information, the second information, and the third information on the client.

Optionally, in this embodiment, in a process of transmitting, by the client, an information request corresponding to a current time interval according to the target time interval, duration of the segment of audio information may not be integer times the target time interval. To ensure that the first information, the second information, and the third information are updated on the client in real time, in a case in which the segment of audio information does not end together with one target time interval, the client may carry audio information received within the target time interval in the information request to transmit the audio information when the receiving the segment of audio information ends. For example, from the beginning of receiving the segment of audio information, an information request corresponding to a current time interval is transmitted every target time interval until the receiving the segment of audio information ends. When the receiving the segment of audio information ends within the last target time interval, an information request corresponding to the last target time interval is transmitted. The last target time interval is a target time interval within which the receiving the segment of audio information ends.

Optionally, in this embodiment, every time the second server receives a second portion of audio information within one target time interval, the second server splices the second portion of audio information and a third portion of audio information received previously to obtain a first portion of audio information. First information, second information, and third information corresponding to the first portion of audio information are obtained, fed back to the client in real time, and displayed by the client on a session interface.

In an optional solution, the displaying, by the client, the first information, the second information, and the third information includes:

S1. The client displays a first session bubble corresponding to the first information, a second session bubble corresponding to the second information, and a third session bubble corresponding to the third information on an interface receiving the segment of audio information.

Optionally, in this embodiment, the first information, the second information, and the third information may be displayed on the session interface of the client in a manner of, but is not limited to, a session bubble.

Figure 9:
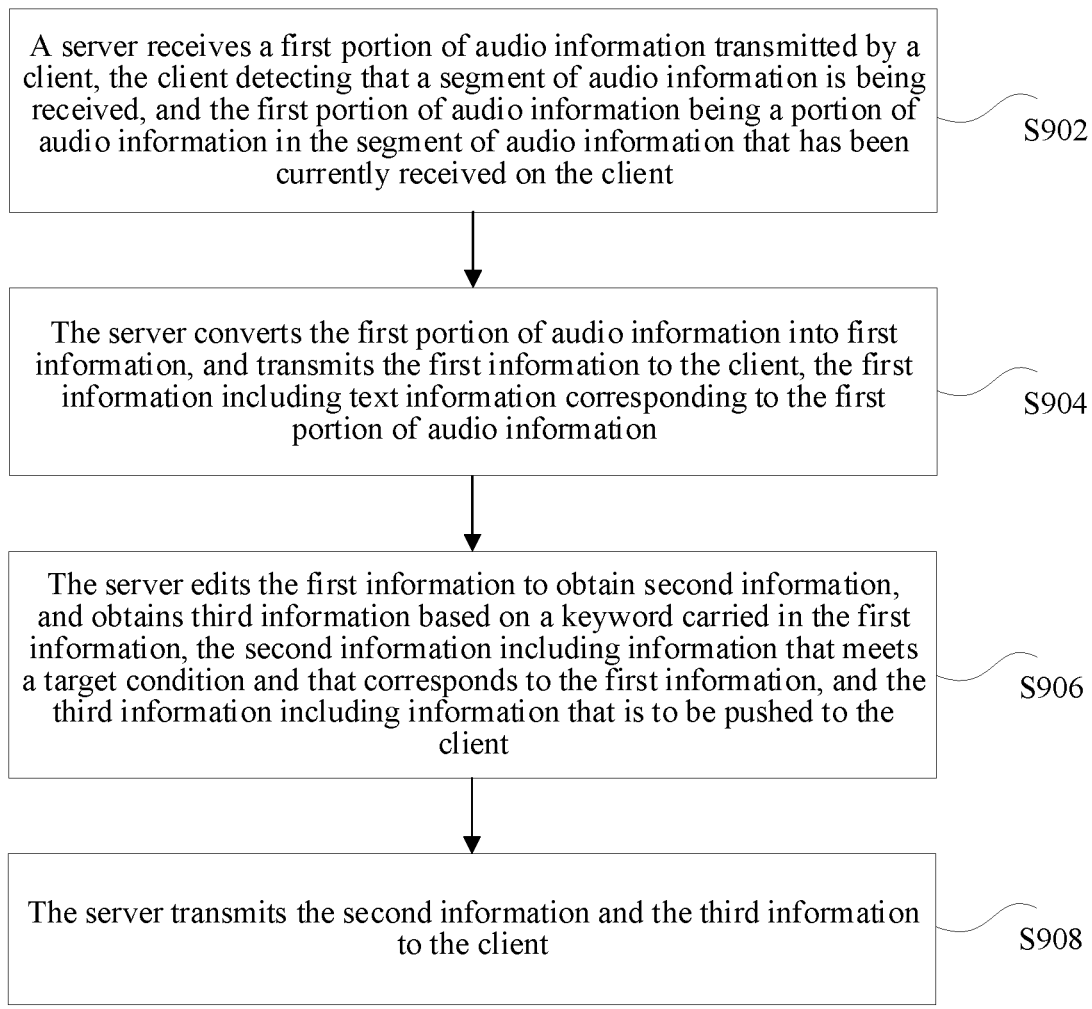
FIG. 9 is a schematic diagram of another optional method for processing audio information according to an embodiment of this application.

According to another aspect of the embodiments of this application, another method for processing audio information is further provided. As shown in FIG. 9, the method includes:

S902. A server receives a first portion of audio information transmitted by a client, it being detected that a segment of audio information is being received on the client, and the first portion of audio information being a portion of audio information in the segment of audio information that has been currently received on the client.

S904. The server converts the first portion of audio information into first information, and transmits the first information to the client, the first information including text information corresponding to the first portion of audio information.

S906. The server edits the first information to obtain second information, and obtains third information based on a keyword carried in the first information, the second information including information that meets a target condition and that corresponds to the first information, and the third information including information that is to be pushed to the client.

S908. The server transmits the second information and the third information to the client.

Optionally, in this embodiment, the method for processing audio information may be applied to, but is not limited to, a scenario in which information inputted by a user through voice is received on a client. The client may be, but is not limited to, various types of applications, for example, an online education application, an instant messaging application, a community space application, a game application, a shopping application, a browser application, a financial application, a multimedia application, and a live broadcast application. Optionally, the method may be applied to, but is not limited to, a scenario in which information inputted by a user through voice is received on the browser application, or may be applied to, but is not limited to, a scenario in which information inputted by a user through voice is received on the instant messaging application, to improve processing efficiency of processing audio information. The foregoing is merely an example, and no limitation is imposed in this embodiment.

Optionally, in this embodiment, the method for processing audio information may be applied to, but is not limited to, a server side. The client transmits a first portion of audio information to a server. The server converts the first portion of audio information into first information, obtains second information and third information corresponding to the first information, and returns the first information, the second information and the third information to the client. The client displays the first information, the second information and the third information.

Optionally, in this embodiment, the audio information may be, but is not limited to, voice information, a song, audio information in a video, or the like.

Optionally, in this embodiment, the first portion of audio information is a portion that has been received in the segment of audio information that is being received and that is detected on the client. The segment of audio information that is being received and that is detected on the client may be a few words said by the user, several lines of lyrics in a song, several lines in a segment of video, and the like.

It can be seen that, through the foregoing steps, when it is detected that a segment of audio information is being received on a client, based on a first portion of audio information in the segment of audio information that has been currently received on the client, text information corresponding to the first portion of audio information is obtained to be used as first information. Information that meets a target condition and that corresponds to the first information is obtained to be used as second information, and information that is to be pushed to the client and that is obtained based on a keyword in the first information is obtained to be used as third information. The first information, the second information, and the third information are simultaneously displayed on the client. More accurate and richer feedback information is provided for a user in real time when the user performs audio input, so that the user may perform different operations based on the obtained information during the audio input, thereby implementing a technical effect that processing efficiency of processing audio information is improved, and further resolving a technical problem of relatively low processing efficiency of processing audio information in the related art.

In an optional solution, the converting, by the server, the first portion of audio information into the first information includes:

S1. The server obtains a second portion of audio information and a third portion of audio information, where the second portion of audio information is audio information transmitted by the client to a second server corresponding to the client within a current time interval, and the third portion of audio information is audio information received by the second server within a time before the current time interval.

S2. The server splices the second portion of audio information and the third portion of audio information in chronological order, to obtain the first portion of audio information.

S3. The server converts the first portion of audio information into text, to obtain the first information.

Optionally, in this embodiment, a frequency of displaying the first information, the second information, and the third information on the client may be set by setting a target time interval. The client may transmit audio information received within a current time interval to the server within each target time interval. Audio information before the current time interval has been stored in the server, and the server splices the two portions of audio information together, and obtains the first information based on information obtained after the splicing.

In an optional solution, the editing, by the server, the first information to obtain second information includes:

S1. The server performs error correction on syntax of the first information based on a target syntax rule, and rewrites the first information based on an error correction result, to obtain rewrite information.

S2. The server supplements the rewrite information based on a target semantic rule, to obtain the information that meets the target condition and that corresponds to the first information, and determines the information that meets the target condition and that corresponds to the first information as the second information.

Optionally, in this embodiment, syntax error correction may be performed on the first information by setting a target syntax rule. The first information may be rewritten after the error correction, to obtain rewrite information without a syntax error. Then, the rewrite information is supplemented based on a set target semantic rule, to obtain the second information without a syntax error and with complete semantics, and the second information is returned to the client.

Optionally, in this embodiment, the rewrite information may be supplemented by using the following manner: extracting a first keyword and a first target word from the first information, where the first target word is a word with incomplete semantics in the first information; obtaining a first tag corresponding to the first keyword, where the first tag is used for indicating a field to which the first keyword belongs; obtaining a second target word matching the first target word from a lexicon corresponding to the first tag, where the second target word is a word with complete semantics; and supplementing the rewrite information with the second target word, to obtain the information that meets the target condition and that corresponds to the first information.

In an optional solution, the obtaining, by the server, third information based on a keyword carried in the first information includes:

S1. The server extracts a second keyword from the first information, and obtains historical session information of a session in which the segment of audio information is located.

S2. The server determines a second tag corresponding to the session based on the second keyword and the historical session information, where the second tag is used for indicating a field to which the session belongs.

S3. The server extracts information matching the second keyword from an information base corresponding to the second tag, and determines the information matching the second keyword as the third information, where the information base stores information in the field indicated by the second tag.

Optionally, in this embodiment, the third information may be, but is not limited to, information that is obtained based on audio information that is currently received and the historical session information and that is in fields to which these pieces of information belong.

For simple descriptions, the foregoing method embodiments are stated as a series of action combinations. However, a person skilled in the art is to know that this application is not limited to the sequence of the described actions because based on this application, some operations may use another sequence or may be simultaneously performed.

Secondarily, a person skilled in the art is to learn that the embodiments described in the specification all belong to optional embodiments and the related actions and modules are not necessary for this application.

According to the descriptions in the foregoing implementations, a person skilled in the art may clearly learn that the method according to the foregoing embodiments may be implemented by relying on software and a necessary and commonly used hardware platform or by using hardware, but in many cases the former is a better implementation. Based on such an understanding, the technical solutions of this application essentially or the part contributing to the related art may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of this application.

Figure 10:
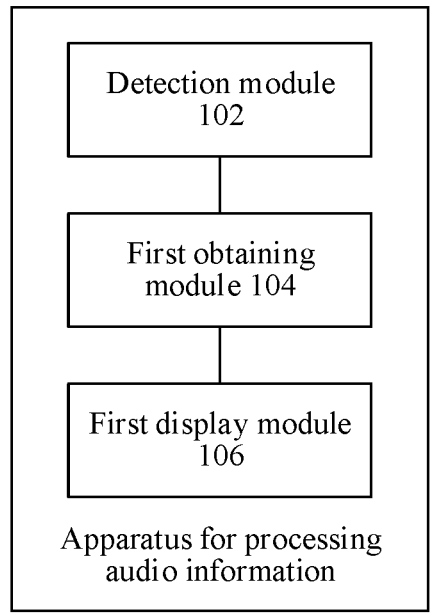
FIG. 10 is a schematic diagram of an optional apparatus for processing audio information according to an embodiment of this application.

According to another aspect of the embodiments of this application, an apparatus for processing audio information used for implementing the foregoing method for processing audio information is further provided. As shown in FIG. 10, the apparatus includes:

1) a detection module 102, configured to detect that a segment of audio information is being received on a client, a first portion of audio information in the segment of audio information having been currently received on the client;

2) a first obtaining module 104, configured to obtain first information, second information, and third information based on the first portion of audio information that has been currently received, the first information including text information corresponding to the first portion of audio information, the second information including information that meets a target condition and that corresponds to the first information, and the third information including information that is to be pushed to the client and that is obtained based on a keyword in the first information; and 3) a first display module 106, configured to display the first information, the second information, and the third information on the client.

Optionally, in this embodiment, the foregoing apparatus for processing audio information may be applied to a hardware environment formed by a terminal 202, a server 204 and a network 206 shown in FIG. 2. As shown in FIG. 2, the terminal 202 is connected to the server 204 by using the network 206. A client 208 is installed on the terminal 202. The terminal 202 is configured to: detect that a segment of audio information is being received on the client 208, a first portion of audio information in the segment of audio information having been currently received on the client 208; obtain first information, second information, and third information based on the first portion of audio information that has been currently received, the first information including text information corresponding to the first portion of audio information, the second information including information that meets a target condition and that corresponds to the first information, and the third information including information that is to be pushed to the client 208 and that is obtained based on a keyword in the first information. When detecting that the segment of audio information is being received, the terminal 202 may transmit the first portion of audio information to the server 204. The server 204 receives the first portion of audio information transmitted by the client 208; converts the first portion of audio information into the first information, and transmits the first information to the client 208; obtains the second information by editing the first information, and obtains the third information based on the keyword carried in the first information; and transmits the second information and the third information to the client 208. The terminal 202 receives the first information, the second information, and the third information transmitted by the server 204, and displays the first information, the second information, and the third information on the client 208.

Optionally, in this embodiment, the foregoing apparatus for processing audio information may be further applied to a hardware environment formed by a terminal 302 shown in FIG. 3. As shown in FIG. 3, a client 304 configured to process audio information is installed on the terminal 302. The terminal 302 detects, on the client 304 by detecting a touch on a microphone icon on a display interface of the client 304, that a segment of audio information is being received on the client 304, and displays, in real time, first information, second information, and third information obtained based on a first portion of audio information in the received segment of audio information on the display interface of the client 304 with inputting of the segment of audio information. The first information is text information corresponding to the first portion of audio information, the second information is information that meets a target condition and that corresponds to the first information, and the third information is information that is to be pushed to the client and that is obtained based on a keyword in the first information. The first information, the second information, and the third information are updated in real time with updating of the first portion of audio information, that is, a portion of information that has been received is converted into text as the first information to be displayed on an interface of the client when the client 304 receives the segment of audio information. Simultaneously, the first information is converted into the second information, and the third information is obtained based on the keyword carried in the first information. The second information and the third information corresponding to the first information are displayed on the interface of the client 304 when the first information is displayed.

Optionally, in this embodiment, the foregoing apparatus for processing audio information may be applied to, but is not limited to, a scenario in which information inputted by a user through voice is received on a client. The client may be, but is not limited to, various types of applications, for example, an online education application, an instant messaging application, a community space application, a game application, a shopping application, a browser application, a financial application, a multimedia application, and a live broadcast application. Optionally, the method may be applied to, but is not limited to, a scenario in which information inputted by a user through voice is received on the browser application, or may be applied to, but is not limited to, a scenario in which information inputted by a user through voice is received on the instant messaging application, to improve processing efficiency of processing audio information. The foregoing is merely an example, and no limitation is imposed in this embodiment.

Optionally, in this embodiment, the apparatus for processing audio information may be applied to, but is not limited to, a terminal device side. For example, a mobile phone, a tablet computer, a PC computer, a smart wearable device, and a smart household device.

Optionally, in this embodiment, the audio information may be, but is not limited to, voice information, a song, audio information in a video, or the like.

Optionally, in this embodiment, a manner in which a client detects whether a segment of audio information is being received may be, but not limited to, detecting operation information received by an icon displayed on the client. For example, as shown in FIG. 4, a session interface is displayed on the client, and a "microphone" icon is displayed on the session interface, to instruct a user to input audio information by operating the icon. When inputting a segment of audio information, the user may continuously touch the icon. The client determines, by detecting the continuous touch operation, that the segment of audio information is being received. When it is detected that the touch operation is interrupted, it is determined that the user has ended current inputting of the audio information. Alternatively, in another manner, a tap operation performed on the icon may be detected. When the first tap operation is detected, it is determined that a segment of audio information begins to be received. When the second tap operation is detected, it is determined that the receiving the segment of audio information ends.

Optionally, in this embodiment, the first portion of audio information is a portion that has been received in the segment of audio information that is being received and that is detected on the client. The segment of audio information that is being received and that is detected on the client may be a few words said by the user, several lines of lyrics in a song, several lines in a segment of video, and the like. Then, a process of receiving these pieces of audio information may last for a period of time, and text information obtained by converting the first portion of audio information that has been received is displayed on the client in real time within the period of time. Therefore, content of information that has been received can be presented to the user in real time. Information that meets a target condition and that corresponds to the text information is presented on the client in real time. If the information is information that the user desires to input, the user may directly use the information to perform a subsequent operation without the need of continuing inputting of audio information, thereby saving time. In addition, to-be-pushed information obtained based on a keyword in the text information is displayed on the client, so that content in which the user may be interested can be recommended to the user in real time, thereby improving user interaction experience.

Optionally, in this embodiment, the target condition may include, but is not limited to, a target syntax rule (the syntax rule may refer to a syntax rule that is specified in a language corresponding to the text information, and that may be obtained through a training process of deep learning, or may be a manually set rule), or a target semantic rule, for example, semantics completion (completion may refer to that a sentence does not lack any element, for example, the sentence has a subject, a predicate, an object, an attribute, an adverbial, and a complement, or may refer to that a sentence can express a complete meaning), or meeting both the target syntax rule and the target semantic rule.

In an optional implementation, as shown in FIG. 5, a session interface into which audio information is inputted is displayed on a client, a user inputs, by tapping a "microphone" icon, and voice information as the foregoing segment of audio information. Voice that the user originally desires to input is "today Beijing's weather". When the user is speaking, it is detected that the segment of audio information is being received. In this case, the user speaks "today" into a microphone, so that the client uses "today" as a first portion of audio information. First information that is obtained based on the first portion of audio information is "today", and second information that meets a target condition and that corresponds to the first information is "today is Sunday". Third information that is to be pushed to the client and that is obtained based on a keyword in the first information is three pieces of news of today: news 1, news 2, and news 3. "today", "today is Sunday", and "news 1, news 2, and news 3" are displayed on the client. Then, the user continues to speak "Beijing". In this case, the client uses "today Beijing" as a first portion of audio information. First information is obtained as "today Beijing", and second information that meets a target condition and that corresponds to the first information is "today Beijing's weather". Third information that is to be pushed to the client and that is obtained based on a keyword in the first information is "today Beijing's weather, today Beijing's activities, and today Beijing's news". "today Beijing", "today Beijing's weather", and "today Beijing's weather, today Beijing's activities, and today Beijing's news" are displayed on the client. After seeing content displayed on the client at this time, the user finds that "today Beijing's weather" is content that the user desires to obtain. The user may tap the second information displayed on the client as complete input information, or tap "today Beijing's weather" in the third information displayed on the client to view weather information.

Optionally, in this embodiment, after the first information, the second information, and the third information are displayed on the client, information about operations performed on these pieces of information may be detected. The user may directly perform operations on these pieces of information, and the client provides different feedback for the user based on different operations.

For example, the user may edit the first information by tapping the first information. Response information corresponding to the second information may be obtained by tapping the second information. A page corresponding to the third information may be viewed by tapping the third information.

Optionally, in this embodiment, the user may perform an editing operation on the first information. The editing operation performed on the first information may be received in a case in which a third operation performed on the first information is detected, and an editing result obtained after performing the editing operation is displayed on the client.

Optionally, in this embodiment, after a tap operation that is performed by the user on the first information is detected, one text input box carrying the first information may be displayed on the client, and an editing operation that is performed by the user on the first information is detected in the text input box. After the editing ends, an editing result in the text input box is used as fourth information and displayed on the client. For example, a text input box carrying the first information is displayed on the client, an editing operation performed on the first information in the text input box is detected, and an editing result is displayed in the text input box in response to the editing operation. In a case in which an editing completion instruction is detected, fourth information corresponding to a target editing result is displayed on a session interface corresponding to the segment of audio information. The target editing result is an editing result displayed in the text input box after editing completion information is detected, and the editing completion instruction is used for indicating that the editing operation has ended.

Optionally, in this embodiment, the client may obtain feedback information corresponding to the fourth information based on the displayed fourth information, and display the feedback information on the client. For example, feedback information corresponding to the fourth information is obtained, and the feedback information is displayed on the session interface.

It can be seen that, through the foregoing apparatus, when it is detected that a segment of audio information is being received on a client, based on a first portion of audio information in the segment of audio information that has been currently received on the client, text information corresponding to the first portion of audio information is obtained to be used as first information. Information that meets a target condition and that corresponds to the first information is obtained to be used as second information, and information that is to be pushed to the client and that is obtained based on a keyword in the first information is obtained to be used as third information. The first information, the second information, and the third information are simultaneously displayed on the client. More accurate and richer feedback information is provided for a user in real time when the user performs audio input, so that the user may perform different operations based on the obtained information during the audio input, thereby implementing a technical effect that processing efficiency of processing audio information is improved, and further resolving a technical problem of relatively low processing efficiency of processing audio information in the related art.

In an optional solution, the foregoing apparatus further includes:

1) a second obtaining module, configured to obtain response information corresponding to the second information in a case that a first operation performed on the second information is detected; and 2) a second display module, configured to display the response information on the client.

Meeting the target condition includes at least one of the following: meeting a target syntax rule, and meeting a target semantic rule.

Optionally, in this embodiment, the first operation may be, but is not limited to, a tap operation. For example, as shown in FIG. 6, first information, second information, and third information are displayed on a client. Response information corresponding to the second information is obtained in a case that a tap operation performed on the second information is detected, and the response information is displayed on the client.

Optionally, in this embodiment, a syntax error of the first information is corrected by setting a target syntax rule. By setting a target semantic rule, the first information or rewrite information whose syntax error is corrected is semantically supplemented, to obtain second information with correct syntax and complete semantics.

Optionally, in this embodiment, the information that meets the target condition and that corresponds to the first information may be information obtained in a manner of performing error correction on the syntax of the first information based on a target syntax rule, rewriting the first information based on an error correction result to obtain rewrite information, and then supplementing the rewrite information based on a target semantic rule.

In an optional solution, the foregoing apparatus further includes:

1) a request module, configured to request a page corresponding to the third information from a first server corresponding to the third information in a case that a second operation performed on the third information is detected;

2) a second receiving module, configured to receive the page returned by the first server; and 3) a third display module, configured to display the page on the client.

Optionally, in this embodiment, the second operation may be, but is not limited to, a tap operation. For example, as shown in FIG. 7, first information, second information, and third information are displayed on a client. A page corresponding to the third information is requested from a first server corresponding to the third information in a case that a tap operation performed on the third information is detected, the page returned by the first server is received, and the received page is displayed on the client.

Optionally, in this embodiment, the third information may include, but is not limited to, content information and one or more pieces of prompt information. The content information is used for indicating content of information that is to be pushed to the client. The detected second operation performed on the third information may include, but is not limited to, a first sub-operation performed on the content information, and a second sub-operation performed on target prompt information in the one or more pieces of prompt information. The requesting a page corresponding to the third information from a first server corresponding to the third information may include, but is not limited to, requesting pages corresponding to any one or more types of information in the foregoing two types of third information. For example, the request module is configured to request a first page corresponding to the content information from the first server in a case that a first sub-operation performed on the content information is detected, where the second operation includes the first sub-operation; and request, in a case that a second sub-operation performed on target prompt information in the one or more pieces of prompt information is detected, a second page corresponding to the target prompt information from the first server, where the second page and the first page are different pages belonging to the same field, or fields to which the second page and the first page belong are different, and the second operation includes the second sub-operation.

In an optional implementation, as shown in FIG. 8, first information, second information, content information, first prompt information, and second prompt information are displayed on a client. The first information is text information corresponding to the first portion of audio information, that is, "Tell a joke", the second information is information that meets a target condition and that corresponds to the first information, that is, "Telling a joke is a matter needing a language skill". The content information is information that is pushed to the client and that is obtained based on a keyword, "joke", in the first information, that is, "A joke: Question: If you want to put an elephant into a refrigerator, how many steps do you need? Answer: Three steps. First, open the door of the refrigerator. Second, get the elephant into it. Finally, close the door." The first prompt information is an icon of "One more", and the second prompt information is an icon of "Funny image". The user may tap information that the user desires to obtain based on a requirement. For example, the client may detect a tap operation performed on the content information, and if the tap operation is detected, an interface of the client jumps to a web page in which the joke is located. The client may detect a tap operation performed on the first prompt information, and if the tap operation is detected, the client obtains another joke and displays the joke on the current interface. The client may further detect a tap operation performed on the second prompt information, and if the tap operation is detected, the client may obtain a funny image and display the funny image on the current interface, or the interface may jump to a web page with funny images.

In an optional solution, the first obtaining module includes:

1) a transmission unit, configured to transmit an information request corresponding to a current time interval every target time interval from the beginning of receiving the segment of audio information, where the information request carries a second portion of audio information, the information request is used for requesting the first information, the second information, and the third information that correspond to the second portion of audio information, and the second portion of audio information is audio information received within the current time interval; and 2) a receiving unit, configured to receive the first information, the second information, and the third information that correspond to the second portion of audio information, where the first information, the second information, and the third information are information obtained based on the first portion of audio information that has been currently received, the first portion of audio information is information obtained by splicing the second portion of audio information and a third portion of audio information in chronological order, and the third portion of audio information is audio information, in the segment of audio information, received within a time before the current time interval.

Optionally, in this embodiment, the client may interact with a second server, thereby obtaining the first information, the second information, and the third information of a current time interval every target time interval. A conversion process of the foregoing first information, second information, and third information may be alternatively performed by the client.

Optionally, in this embodiment, a frequency of displaying the first information, the second information, and the third information on the client may be set by setting a target time interval. For example, the target time interval may be set to 200 ms. When receiving a segment of audio information, the client transmits the second portion of audio information once to the second server every 200 ms, thereby obtaining the first information, the second information, and the third information returned by the second server, and displaying the first information, the second information, and the third information on the client.

Optionally, in this embodiment, in a process of transmitting, by the client, an information request corresponding to a current time interval based on the target time interval, duration of the segment of audio information may not be integer times the target time interval. To ensure that the first information, the second information, and the third information are updated on the client in real time, in a case in which the segment of audio information does not end together with one target time interval, the client may carry audio information received within the target time interval in the information request to transmit the audio information when the receiving the segment of audio information ends. For example, from the beginning of receiving the segment of audio information, an information request corresponding to a current time interval is transmitted every target time interval until the receiving the segment of audio information ends. When the receiving the segment of audio information ends within the last target time interval, an information request corresponding to the last target time interval is transmitted. The last target time interval is a target time interval within which the receiving the segment of audio information ends.

Optionally, in this embodiment, every time the second server receives a second portion of audio information within one target time interval, the second server splices the second portion of audio information and a third portion of audio information received previously to obtain a first portion of audio information. First information, second information, and third information corresponding to the first portion of audio information are obtained, fed back to the client in real time, and displayed by the client on a session interface.

In an optional solution, the first display module is configured to display a first session bubble corresponding to the first information, a second session bubble corresponding to the second information, and a third session bubble corresponding to the third information on an interface receiving the segment of audio information.

Optionally, in this embodiment, the first information, the second information, and the third information may be displayed on the session interface of the client in a manner of, but is not limited to, a session bubble.

Figure 11:
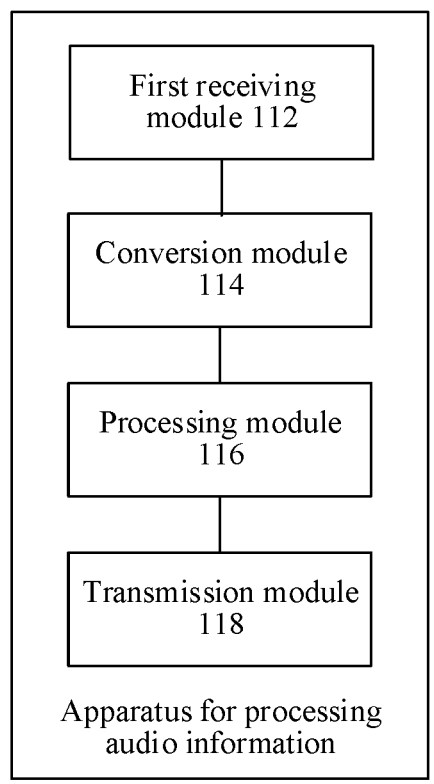
FIG. 11 is a schematic diagram of another optional apparatus for processing audio information according to an embodiment of this application.

According to another aspect of the embodiments of this application, another apparatus for processing audio information used for implementing the foregoing method for processing audio information is further provided. As shown in FIG. 11, the apparatus includes:

1) a first receiving module 112, configured to receive a first portion of audio information transmitted by a client, it being detected that a segment of audio information is being received on the client, and the first portion of audio information being a portion of audio information in the segment of audio information that has been currently received on the client;

2) a conversion module 114, configured to convert the first portion of audio information into first information, and transmit the first information to the client, the first information including text information corresponding to the first portion of audio information;

3) a processing module 116, configured to edit the first information to obtain second information, and obtain third information based on a keyword carried in the first information, the second information including information that meets a target condition and that corresponds to the first information, and the third information including information that is to be pushed to the client; and 4) a transmission module 118, configured to transmit the second information and the third information to the client.

Optionally, in this embodiment, the foregoing apparatus for processing audio information may be applied to, but is not limited to, a scenario in which information inputted by a user through voice is received on a client. The client may be, but is not limited to, various types of applications, for example, an online education application, an instant messaging application, a community space application, a game application, a shopping application, a browser application, a financial application, a multimedia application, and a live broadcast application. Optionally, the method may be applied to, but is not limited to, a scenario in which information inputted by a user through voice is received on the browser application, or may be applied to, but is not limited to, a scenario in which information inputted by a user through voice is received on the instant messaging application, to improve processing efficiency of processing audio information. The foregoing is merely an example, and no limitation is imposed in this embodiment.

Optionally, in this embodiment, the foregoing apparatus for processing audio information may be applied to, but is not limited to, a server side. The client transmits a first portion of audio information to a server. The server converts the first portion of audio information into first information, obtains second information and third information corresponding to the first information, and returns the first information, the second information and the third information to the client. The client displays the first information, the second information and the third information.

Optionally, in this embodiment, the audio information may be, but is not limited to, voice information, a song, audio information in a video, or the like.

Optionally, in this embodiment, the first portion of audio information is a portion that has been received in the segment of audio information that is being received and that is detected on the client. The segment of audio information that is being received and that is detected on the client may be a few words said by the user, several lines of lyrics in a song, several lines in a segment of video, and the like.

It can be seen that, through the foregoing apparatus, when it is detected that a segment of audio information is being received on a client, based on a first portion of audio information in the segment of audio information that has been currently received on the client, text information corresponding to the first portion of audio information is obtained to be used as first information. Information that meets a target condition and that corresponds to the first information is obtained to be used as second information, and information that is to be pushed to the client and that is obtained based on a keyword in the first information is obtained to be used as third information. The first information, the second information, and the third information are simultaneously displayed on the client. More accurate and richer feedback information is provided for a user in real time when the user performs audio input, so that the user may perform different operations based on the obtained information during the audio input, thereby implementing a technical effect that processing efficiency of processing audio information is improved, and further resolving a technical problem of relatively low processing efficiency of processing audio information in the related art.

In an optional solution, the conversion module includes:

1) an obtaining unit, configured to obtain a second portion of audio information and a third portion of audio information, where the second portion of audio information is audio information transmitted by the client to a second server corresponding to the client within a current time interval, and the third portion of audio information is audio information received by the second server within a time before the current time interval;

2) a splicing unit, configured to splice the second portion of audio information and the third portion of audio information in chronological order, to obtain the first portion of audio information; and 3) a conversion unit, configured to convert the first portion of audio information into text, to obtain the first information.

Optionally, in this embodiment, a frequency of displaying the first information, the second information, and the third information on the client may be set by setting a target time interval. The client may transmit audio information received within a current time interval to the server within each target time interval. Audio information before the current time interval has been stored in the server, and the server splices the two portions of audio information together, and obtains the first information based on information obtained after the splicing.

In an optional solution, the processing module includes:

1) an error correction unit, configured to perform error correction on syntax of the first information based on a target syntax rule, and rewrite the first information based on an error correction result, to obtain rewrite information; and 2) a supplement unit, configured to supplement the rewrite information based on a target semantic rule, to obtain the information that meets the target condition and that corresponds to the first information, and determine the information that meets the target condition and that corresponds to the first information as the second information.

Optionally, in this embodiment, syntax error correction may be performed on the first information by setting a target syntax rule. The first information may be rewritten after the error correction, to obtain rewrite information without a syntax error. Then, the rewrite information is supplemented based on a set target semantic rule, to obtain the second information without a syntax error and with complete semantics, and the second information is returned to the client.

Optionally, in this embodiment, the supplement unit includes: an extraction subunit, configured to extract a first keyword and a first target word from the first information, where the first target word is a word with incomplete semantics in the first information; a first obtaining subunit, configured to obtain a first tag corresponding to the first keyword, where the first tag is used for indicating a field to which the first keyword belongs; a second obtaining subunit, configured to obtain a second target word matching the first target word from a lexicon corresponding to the first tag, where the second target word is a word with complete semantics; and a supplement subunit, configured to supplement the rewrite information with the second target word, to obtain the information that meets the target condition and that corresponds to the first information.

In an optional solution, the processing module includes:

1) a first extraction unit, configured to extract a second keyword from the first information, and obtain historical session information of a session in which the segment of audio information is located;

2) a determining unit, configured to determine a second tag corresponding to the session based on the second keyword and the historical session information, where the second tag is used for indicating a field to which the session belongs; and 3) a second extraction unit, configured to extract information matching the second keyword from an information base corresponding to the second tag, and determine the information matching the second keyword as the third information, where the information base stores information in the field indicated by the second tag.

Optionally, in this embodiment, the third information may be, but is not limited to, information that is obtained based on audio information that is currently received and the historical session information and that is in fields to which these pieces of information belong.

For an application environment of the embodiments of this application, reference may be made but is not limited to the application environment of the foregoing embodiments. This is not described in detail in this embodiment. The embodiments of this application provide an optional and specific application example for implementing the foregoing method for processing audio information.

Figure 12:
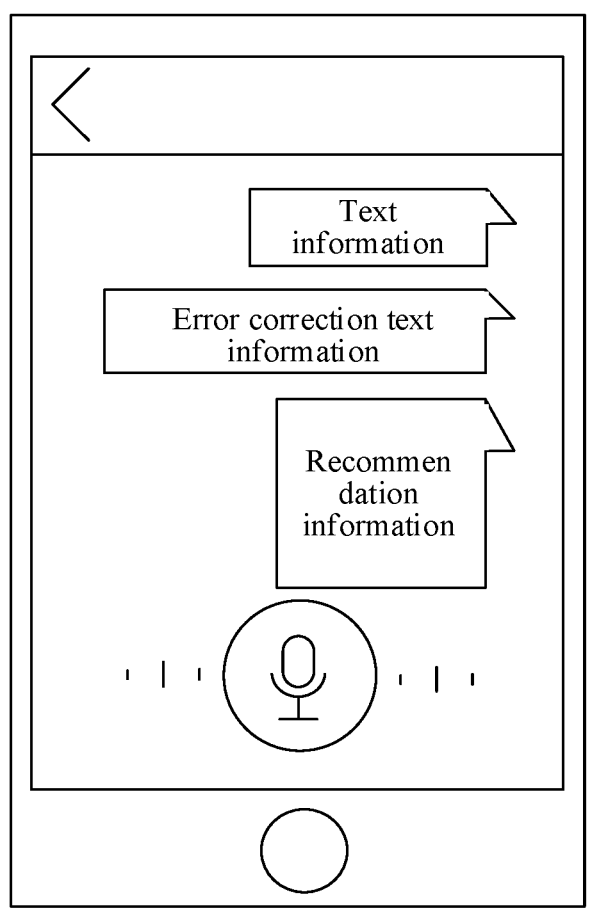
FIG. 12 is a schematic diagram of an application scenario of an optional method for processing audio information according to an embodiment of this application.

In an optional embodiment, the foregoing method for processing audio information may be applied to, but is not limited to, a scenario of processing audio information received by a voice assistant shown in FIG. 12. In this scenario, the voice assistant constantly transmits original recording information recorded by a microphone to a backend server to convert the original recording information into text information. In a process in which the backend server returns the text information obtained through conversion, auxiliary input text is returned to improve user experience. The returned auxiliary input text includes: error correction text information and recommendation information based on chat history content. The terminal presents the text to a user in a manner of bubbles. The entire process is constantly dynamically changed and adjusted with a recording process, and the user may directly tap a bubble to transmit a request to consume based on a requirement of the user.

The foregoing manner can be helpful in that, in a process in which a user performs voice input, an error correction prompt is performed in real time based on content that is currently inputted by the user, and related content is recommended to the user based on context semantics of a session flow of the user, to improve user experience of voice input of the user.

As shown in FIG. 12, the user may conveniently tap a bubble request. The bubble request shows up in a manner of bubbles in a voice input process and after a session completion process. Content of the bubble may be two manners of error correction and recommendation.

Optionally, in this embodiment, in a process in which the user continuously performs voice input, a terminal uses 100-ms voice data as a target time interval, and constantly requests the backend server to obtain text information of what has been currently spoken through conversion. The backend server receives information transmitted by the terminal every 100 ms, and converts the information into text information of voice information that has been currently inputted by the user. Because the user has not finished speaking, the text information obtained through conversion is incomplete, and even a syntax error may exist. In this case, an error correction module in the terminal may provide a segment of complete text, without a syntax error, that is corrected based on current text content, to return the text to the terminal and provide the text for the user to select and use.

Optionally, in this embodiment, the user may directly tap the bubble to transmit a request to consume based on a requirement of the user.

For example, if the user has inputted a portion of voice, text that has been obtained through conversion by the backend server is "Li in Honor of Kings". In this case, this sentence may be supplemented as "how to play Li Bai in Honor of Kings" by using error correction information, and a designated field is "game." Simultaneously, two bubbles, that is, "encyclopedia of the poetic genius Li Bai" and field "encyclopedia" may be further recommended to the terminal based on context. When the user taps the bubbles, provided that the terminal transmits bubble text and field information to the backend server, the user can correctly consume a corresponding service. If the user does not desire content of the foregoing two bubbles, the user keeps speaking until speaking is finished.

Figure 13:
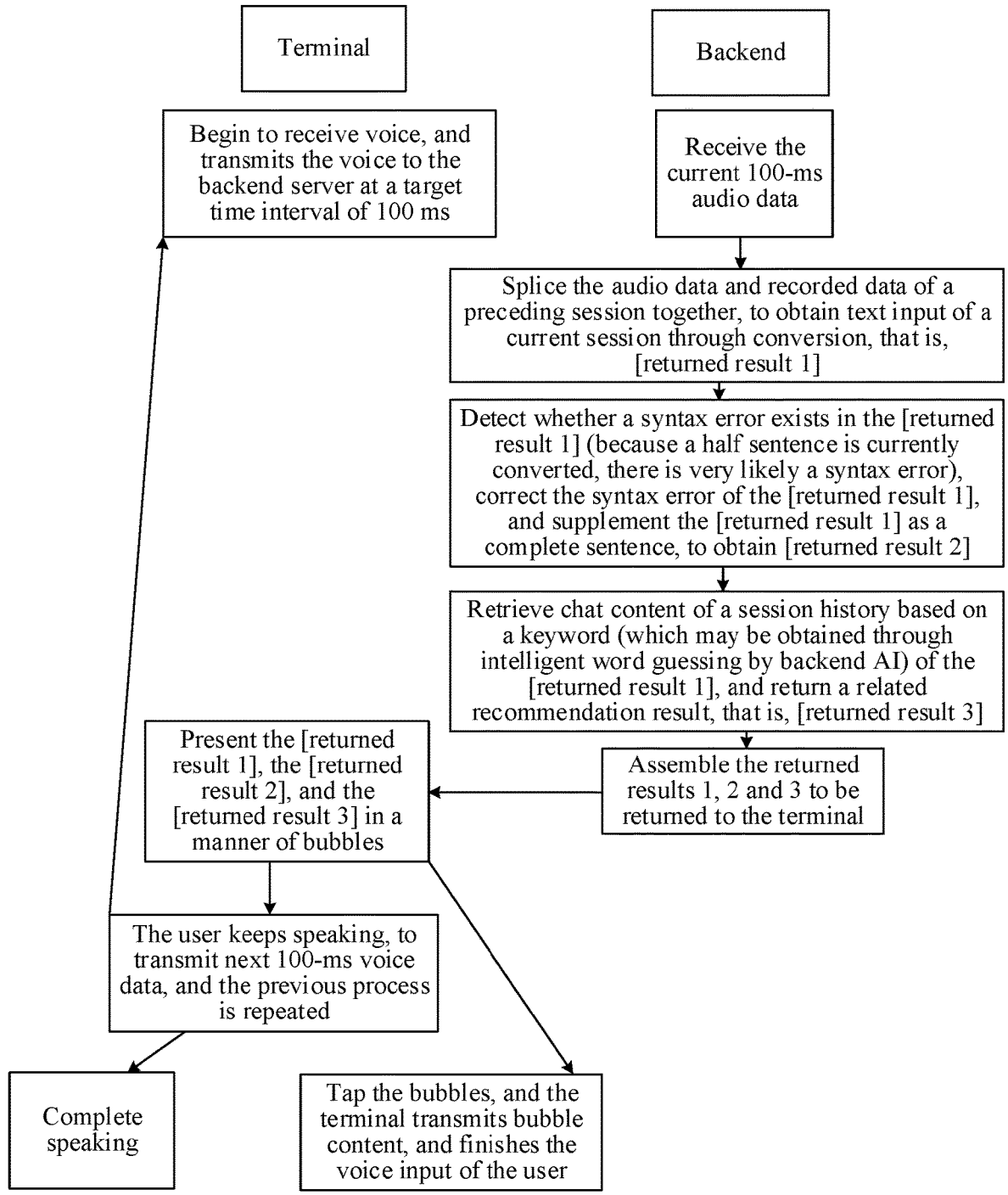
FIG. 13 is a schematic diagram of an application scenario of another optional method for processing audio information according to an embodiment of this application.

In an optional implementation, as shown in FIG. 13, the terminal begins to receive voice, and transmits the voice to the backend server at a target time interval of 100 ms. The backend server receives the current 100-ms audio data, and splices the audio data and recorded data of a preceding session together, to obtain text input of a current session through conversion, that is, [returned result 1]. The backend server detects whether a syntax error exists in the [returned result 1] (because a half sentence is currently converted, there is very likely a syntax error), and corrects the syntax error of the [returned result 1]. The [returned result 1] is supplemented as a complete sentence, to obtain [returned result 2]. The backend server retrieves chat content of a session history based on a keyword (which may be obtained through intelligent word guessing by backend AI) of the [returned result 1], and returns a related recommendation result, that is, [returned result 3]. The returned results 1, 2 and 3 are assembled to be returned to the terminal. The assembly described herein may be putting the [returned result 1], the [returned result 2], and the [returned result 3] into one response to be returned to the terminal together. The terminal presents the [returned result 1], the [returned result 2], and the [returned result 3] in a manner of bubbles. The user keeps speaking, to transmit next 100-ms voice data, and the previous process is repeated. The user may finish speaking, or may tap the bubbles. The terminal transmits bubble content, and finishes the voice input of the user.

In the foregoing process, the bubbles presented by the terminal are formed by: presented text, which is text information that is presented on the bubble and that is visible to the user; transmitted text, which is text information that is transmitted to an artificial intelligence backend and that is corrected and supplemented through machine understanding; and a field intention, which is a field intention that is textually identified and that is transmitted to the artificial intelligence backend, for example, whether Li Bai is the poet Li Bai or Li Bai in the game of Honor of Kings.

Optionally, in this embodiment, when the user performs the voice input, a bubble may be presented in real time. In a process in which a voice stream of the user is converted into text, the backend returns a text stream that is obtained by converting voice and modified bubble data of currently inputted text in real time. There may be a plurality of pieces of bubble data, and the bubble data may be returned in a manner of array.

Optionally, in this embodiment, after the user finishes the voice input, and current session returning of the voice assistant is finished, an auxiliary bubble floats above an input stream at the end of the session.

Optionally, in this embodiment, an error correction function is provided in bubble presenting. Syntax error correction and supplement are performed on the text information obtained through conversion based on text that is obtained by converting voice that the user has recorded and by using an artificial intelligence library of syntax learning of NLP.

Optionally, in this embodiment, a recommendation function is further provided in bubble presenting. Related information is recommended to the user based on text that is obtained by converting voice that the user has recorded and context semantics of a chat history.

Optionally, in this embodiment, the entire process of the bubble presenting includes the following steps:

Step 1. The user taps the terminal to begin to record, and the terminal constantly transmits original audio data recorded by a microphone to a backend in a unit of a time length of 100 ms. The backend receives the segment of audio data, performs text conversion in combination with the audio data that has been uploaded before, and transmits the text information obtained through conversion to the terminal to be presented to the user. This process is continuously repeated until the user finishes inputting.

Step 2. After receiving original voice input, the backend converts the audio data into text based on the voice input that is currently uploaded and the voice input that is uploaded before. In this case, the returned text is text in real-time speaking.

Step 3. The backend uses the text information obtained through conversion in step 2 as an input, and requests an error correction module. The error correction module returns recommended error correction text. If there is no syntax error in the text returned by step 2, the error correction module automatically supplements the text based on a hot word.

Step 4. The backend uses the text information obtained through conversion in step 2 as an input, and requests a session server. The session server retains current session content of the user, and the session server returns related recommendation information based on history chat content.

Step 5. The backend splices a result in step 3 into a bubble of an error correction type and a result returned by step 4 into a recommendation bubble, and returns the bubbles to the terminal.

Step 6. The terminal presents the bubbles to be provided for the user to tap for consumption.

Through the foregoing process, an error correction function in the voice input process is implemented, and a recommendation function in the voice input process is implemented. The recommendation function enables recommended content to better understand the user based on chat context semantics. An auxiliary input function of a bubble after the voice input is further implemented.

Figure 14:
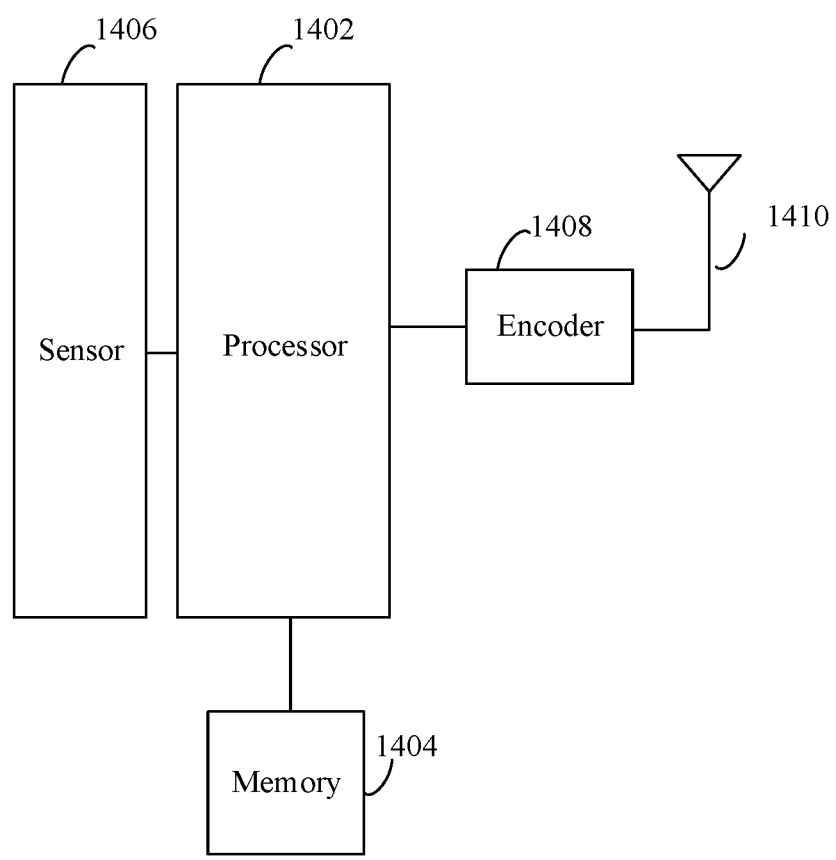
FIG. 14 is a schematic diagram of an optional electronic apparatus according to an embodiment of this application.

According to still another aspect of the embodiments of this application, an electronic apparatus configured to implement the foregoing method for processing audio information is further provided. As shown in FIG. 14, the electronic apparatus includes one or more processors 1402 (only one processor is shown in the figure), a memory 1404, a sensor 1406, an encoder 1408, and a transmission apparatus 1410. The memory stores a computer program, and the processor is configured to perform steps in any one of the foregoing method embodiments by using the computer program.

Optionally, in this embodiment, the foregoing electronic apparatus may be located in at least one of a plurality of network devices in a computer network.

Optionally, in this embodiment, the processor may be configured to perform the following steps by using the computer program:

S1. Detect that a segment of audio information is being received on a client, a first portion of audio information in the segment of audio information having been currently received on the client.

S2. Obtain first information, second information, and third information based on the first portion of audio information that has been currently received, the first information including text information corresponding to the first portion of audio information, the second information including information that meets a target condition and that corresponds to the first information, and the third information including information that is to be pushed to the client and that is obtained based on a keyword in the first information.

S3. Display the first information, the second information, and the third information on the client.

In another aspect of the embodiments of this application, the processor may be further configured to perform the following steps by using a computer program:

S1. Receive a first portion of audio information transmitted by a client, it being detected that a segment of audio information is being received on the client, and the first portion of audio information being a portion of audio information in the segment of audio information that has been currently received on the client.

S2. Convert the first portion of audio information into first information, and transmit the first information to the client, the first information including text information corresponding to the first portion of audio information.

S3. Edit the first information to obtain second information, and obtain third information based on a keyword carried in the first information, the second information including information that meets a target condition and that corresponds to the first information, and the third information including information that is to be pushed to the client.

S4. Transmit the second information and the third information to the client.

Optionally, a person of ordinary skill in the art may understand that, the structure shown in FIG. 14 is only schematic. The electronic apparatus may be a terminal device such as a smartphone (such as an Android mobile phone or an iOS mobile phone), a tablet computer, a palmtop computer, a mobile Internet device (MID), or a PAD. FIG. 14 does not limit the structure of the foregoing electronic apparatus. For example, the electronic apparatus may further include more or less components (such as a network interface and a display apparatus) than those shown in FIG. 14, or has a configuration different from that shown in FIG. 14.

The memory 1402 may be configured to store a software program and a module, for example, a program instruction/module corresponding to the method and the apparatus for processing audio information in the embodiments of this application, and the processor 1404 performs various functional applications and data processing by running the software program and the module stored in the memory 1402, that is, implementing the foregoing method for processing audio information. The memory 1402 may include a high-speed random memory, and may further include a non-volatile memory such as one or more magnetic storage apparatuses, a flash, or another non-volatile solid-state memory. In some examples, the memory 1402 may further include memories remotely disposed relative to the processor 1404, and these remote memories may be connected to a terminal through a network. Instances of the network include, but are not limited to, the Internet, an intranet, a local area network, a mobile communications network, and a combination thereof.

The transmission apparatus 1410 is configured to receive or send data through a network. Specific instances of the foregoing network may include a wired network and a wireless network. In an example, the transmission apparatus 1410 includes a network interface controller (NIC). The NIC may be connected to another network device and a router by using a network cable, so as to communicate with the Internet or the local network. In an example, the transmission apparatus 1410 is a radio frequency (RF) module, and is configured to wirelessly communicate with the Internet.

Optionally, the memory 1402 is configured to store an application program.

An embodiment of this application further provides a storage medium. The storage medium stores a computer program, the computer program being configured to perform steps in any one of the foregoing method embodiments when being run.

Optionally, in this embodiment, the storage medium may be configured to store a computer program used for performing the following steps:

S1. Detect that a segment of audio information is being received on a client, a first portion of audio information in the segment of audio information having been currently received on the client.

S2. Obtain first information, second information, and third information based on the first portion of audio information that has been currently received, the first information including text information corresponding to the first portion of audio information, the second information including information that meets a target condition and that corresponds to the first information, and the third information including information that is to be pushed to the client and that is obtained based on a keyword in the first information.

S3. Display the first information, the second information, and the third information on the client.

According to another aspect of the embodiments of this application, the storage medium may be further configured to store a computer program for performing the following steps:

S1. Receive a first portion of audio information transmitted by a client, it being detected that a segment of audio information is being received on the client, and the first portion of audio information being a portion of audio information in the segment of audio information that has been currently received on the client.

S2. Convert the first portion of audio information into first information, and transmit the first information to the client, the first information including text information corresponding to the first portion of audio information.

S3. Edit the first information to obtain second information, and obtain third information based on a keyword carried in the first information, the second information including information that meets a target condition and that corresponds to the first information, and the third information including information that is to be pushed to the client.

S4. Transmit the second information and the third information to the client.

Optionally, the storage medium is further configured to store a computer program for performing steps included in the method in the foregoing embodiments. This is not described again in this embodiment.

Optionally, in this embodiment, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

The sequence numbers of the foregoing embodiments of this application are merely for the convenience of description, and do not imply the preference among the embodiments.

In a case that the integrated unit in the foregoing embodiments is implemented in the form of a software function unit and sold or used as an independent product, the integrated unit may be stored in the foregoing computer-readable storage medium. Based on such understanding, the technical solutions of this application essentially, or some contributing to the related art, or all or some of the technical solutions may be implemented in a form of a software product. The computer software product is stored in a storage medium and includes several instructions for instructing one or more computer devices (which may be a PC, a server, a network device, or the like) to perform all or some of operations of the methods in the embodiments of this application.

In the foregoing embodiments of this application, descriptions of the embodiments have different emphases, and as for parts that are not described in detail in one embodiment, reference can be made to the relevant descriptions of the other embodiments.

In the several embodiments provided in this application, it is understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of software functional unit.

The above descriptions are merely optional implementations of this application, and a person of ordinary skill in the art can make various improvements and refinements without departing from the spirit of this application. All such modifications and refinements are to also be intended to be covered by this application.

Industrial applicability: it can be known from the foregoing descriptions that, in this application, more accurate and richer feedback information is provided for a user in real time when the user performs audio input, so that the user may perform different operations based on the obtained information during the audio input, thereby implementing a technical effect that processing efficiency of processing audio information is improved, and further resolving a technical problem of relatively low processing efficiency of processing audio information in the related art.

What is claimed is:

1. A method for processing audio information, comprising:
    detecting, by a client, a segment of unilateral continuous audio information being received, a first portion of audio information in the segment of unilateral continuous audio information having been currently received on the client;
    obtaining, by the client, first information, second information, and third information based on the first portion of audio information that has been currently received, the first information comprising text information corresponding to the first portion of audio information, the second information comprising a predicted intent information that meets a target condition and corresponds to the first information, and the third information comprising the predicted intent information and an alternative intent information to be pushed to the client, which is obtained based on the first information; and
    simultaneously displaying and updating, by the client, the first information, the second information, and the third information while receiving the segment of unilateral continuous audio information incrementally.

2. The method according to claim 1, wherein after the displaying, by the client, the first information, the second information, and the third information, the method further comprises:
    obtaining, by the client, response information corresponding to the second information in response to detecting a first operation performed on the second information; and
    displaying, by the client, the response information, wherein
    the target condition comprises at least one of a target syntax rule or a target semantic rule.

3. The method according to claim 2, wherein the information that meets the target condition and corresponds to the first information is obtained by:
    performing error correction on a syntax of the first information based on the target syntax rule;
    rewriting the first information based on an error correction result to obtain rewrite information; and
    supplementing the rewrite information based on the target semantic rule.

4. The method according to claim 2, wherein the target syntax rule is obtained through a training process of deep learning or is a manually set rule.

5. The method according to claim 2, wherein the first operation comprises a tap operation.

6. The method according to claim 1, wherein the method further comprises:
    from a beginning of receiving the segment of audio information, transmitting, by the client, an information request corresponding to a current time interval every target time interval, wherein the information request carries a second portion of audio information in the segment of unilateral continuous audio information, and the second portion of audio information is audio information received within the current time interval; and
    receiving, by the client, updated first information, updated second information, and updated third information, wherein the updated first information, the updated second information, and the updated third information are information obtained based on an updated first portion of audio information that has been currently received, the updated first portion of audio information is audio information obtained by splicing the second portion of audio information and a third portion of audio information in chronological order, and the third portion of audio information is audio information, in the segment of audio information, received before the current time interval; and
    simultaneously displaying, by the client, the updated first information, the updated second information, and the updated third information.

7. The method according to claim 6, wherein the transmitting the information request corresponding to the current time every target time interval comprises:
    from the beginning of receiving the segment of audio information, transmitting, by the client, the information request corresponding to the current time interval every target time interval until the receiving the segment of audio information ends; and
    in response to the receiving the segment of audio information ending within a last target time interval, transmitting an information request corresponding to the last target time interval within the last target time interval, wherein the last target time interval is a target time interval within which the receiving the segment of audio information ends.

8. The method according to claim 1, wherein the segment of audio information comprises voice information, a song, or audio information in a video.

9. The method according to claim 1, wherein the detecting the segment of audio information being received comprises:
  determining that the segment of audio information is being received by detecting a continuous touch operation on the client.

10. The method according to claim 1, the method further comprises:
  detecting an editing operation performed on the first information; and
  in response the editing operation being completed, displaying fourth information corresponding to a target editing result of the editing operation.

11. The method according to claim 10, wherein the method further comprises:
  obtaining feedback information corresponding to the fourth information based on the displayed fourth information; and
  displaying the feedback information.

12. The method according to claim 1, wherein the displaying the first information, the second information, and the third information comprises:
  displaying a first session bubble corresponding to the first information, a second session bubble corresponding to the second information, and a third session bubble corresponding to the third information.

13. A non-transitory machine-readable media, having instructions stored on the machine-readable media, the instructions configured to, when executed, cause a machine to:
  detect a segment of unilateral continuous audio information being received, a first portion of audio information in the segment of unilateral continuous audio information having been currently received on a client;
  obtain first information, second information, and third information based on the first portion of audio information that has been currently received, the first information comprising text information corresponding to the first portion of audio information, the second information comprising a predicted intent information that meets a target condition and corresponds to the first information, and the third information comprising the predicted intent information and an alternative intent information to be pushed to the client, which is obtained based on a keyword in the first information;
  simultaneously display and update the first information, the second information, and the third information while receiving the segment of unilateral continuous audio information incrementally.

* * * * *